US011361497B2

(12) United States Patent
Ishikawa et al.

(10) Patent No.: US 11,361,497 B2
(45) Date of Patent: Jun. 14, 2022

(54) INFORMATION PROCESSING DEVICE AND INFORMATION PROCESSING METHOD

(71) Applicant: SONY CORPORATION, Tokyo (JP)

(72) Inventors: Tsuyoshi Ishikawa, Kanagawa (JP); Kei Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 16/606,391

(22) PCT Filed: Mar. 30, 2018

(86) PCT No.: PCT/JP2018/013713
§ 371 (c)(1),
(2) Date: Oct. 18, 2019

(87) PCT Pub. No.: WO2018/216355
PCT Pub. Date: Nov. 29, 2018

(65) Prior Publication Data
US 2021/0110596 A1    Apr. 15, 2021

(30) Foreign Application Priority Data

May 24, 2017  (JP) .............................. JP2017-102868

(51) Int. Cl.
*G06T 15/20* (2011.01)
*G06F 3/01* (2006.01)
(Continued)

(52) U.S. Cl.
CPC .............. *G06T 15/20* (2013.01); *G06F 3/011* (2013.01); *G06F 3/165* (2013.01); *H04S 7/303* (2013.01); *H04S 2400/11* (2013.01)

(58) Field of Classification Search
CPC .......... G06T 12/20; G06F 3/011; G06F 3/165; H04S 7/303
(Continued)

(56) References Cited

U.S. PATENT DOCUMENTS 5,909,208 A      6/1999   Blomdahl
2002/0097267 A1*  7/2002   Dinan ..................... H04L 29/06
                                                           715/757
(Continued)

FOREIGN PATENT DOCUMENTS

CN           1719852 A     1/2006
CN         105190513 A    12/2015
(Continued)

OTHER PUBLICATIONS

International Search Report and Written Opinion of PCT Application No. PCT/JP2018/013713, dated May 15, 2018, 10 pages of ISRWO.

(Continued)

*Primary Examiner* — Jin Ge
(74) *Attorney, Agent, or Firm* — Chip Law Group

(57) ABSTRACT

An information processing device and an information processing method are provided. The information processing device including a display controller that controls display for a first user on the basis of a background image arranged in a virtual space with reference to a position of the first user in the virtual space, and an object related to a second user arranged in the virtual space so as to maintain a relative positional relationship between the first user and the second user in the virtual space.

20 Claims, 16 Drawing Sheets

(51) Int. Cl.
  *G06F 3/16* (2006.01)
  *H04S 7/00* (2006.01)
(58) Field of Classification Search
  USPC .......................................................... 345/419
  See application file for complete search history.

(56) References Cited

U.S. PATENT DOCUMENTS

| | | | |
|---|---|---|---|
| 2006/0008117 A1 | 1/2006 | Kanada | |
| 2009/0150357 A1 | 6/2009 | Iizuka | |
| 2014/0292640 A1 | 10/2014 | Motokura et al. | |
| 2015/0279081 A1 | 10/2015 | Monk et al. | |
| 2016/0042570 A1* | 2/2016 | Hamada | G06F 3/04815 |
| | | | 345/633 |
| 2016/0260251 A1 | 9/2016 | Stafford et al. | |
| 2017/0024932 A1* | 1/2017 | Sugaya | G02B 27/017 |
| 2017/0102766 A1 | 4/2017 | Hayashida | |
| 2017/0103564 A1 | 4/2017 | Hayashida | |
| 2017/0339372 A1* | 11/2017 | Valli | H04N 7/157 |
| 2018/0189555 A1* | 7/2018 | Satake | G06F 3/011 |
| 2018/0329603 A1* | 11/2018 | Sawaki | G02B 27/017 |
| 2018/0330536 A1* | 11/2018 | Sawaki | G06F 3/012 |
| 2018/0373413 A1* | 12/2018 | Sawaki | H04N 13/332 |
| 2019/0329136 A1* | 10/2019 | Koyama | A63F 13/577 |

FOREIGN PATENT DOCUMENTS

| | | |
|---|---|---|
| EP | 2783734 A1 | 10/2014 |
| JP | 2006-025281 A | 1/2006 |
| JP | 2007-188310 A | 7/2007 |
| JP | 2009-140197 A | 6/2009 |
| JP | 2014-195599 A | 10/2014 |
| JP | 2017-073042 A | 4/2017 |
| JP | 2017-076202 A | 4/2017 |

OTHER PUBLICATIONS

Office Action for CN Patent Application No. 201880032589.X, dated Sep. 9, 2021, 9 pages of Office Action and 13 pages of English Translation.

"Facebook Social VR Demo-Oculus Connect 2016", Road to VR, Oct. 7, 2016.

Office Action for JP Patent Application No. 2019519500, dated Nov. 30, 2021, 04 pages of English Translation and 04 pages of Office Action.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/013713 filed on Mar. 30, 2018, which claims priority benefit of Japanese Patent Application No. JP 2017-102868 filed in the Japan Patent Office on May 24, 2017. Each of the above-referenced applications is hereby incorporated herein by reference in its entirety.

TECHNICAL FIELD

The present disclosure relates to an information processing device, an information processing method, and a program.

BACKGROUND ART

In recent years, a so-called omnidirectional image (360-degree image) acquired by an omnidirectional camera or the like for capturing images in all upper, lower, right, and left directions has been displayed (for example, Patent Document 1 below). By viewing such an image, the user can feel as if he/she exists in a space inside the image, for example.

CITATION LIST

Patent Document

Patent Document 1: Japanese Patent Application Laid-open No. 2016-105593

SUMMARY OF THE INVENTION

Problems to be Solved by the Invention

There has been a demand for a technology for viewing an image as described above while virtually sharing it with other users.

Solutions to Problems

According to the present disclosure, provided is an information processing device including a display controller that controls display for a first user on the basis of a background image arranged in a virtual space with reference to a position of the first user in the virtual space, and an object related to a second user arranged in the virtual space so as to maintain a relative positional relationship between the first user and the second user in the virtual space.

Additionally, according to the present disclosure, provided is an information processing method including controlling display for a first user on the basis of a background image arranged in a virtual space with reference to a position of the first user in the virtual space, and an object related to a second user arranged in the virtual space so as to maintain a relative positional relationship between the first user and the second user in the virtual space.

Additionally, according to the present disclosure, provided is a program for causing a computer to implement a function of controlling display for a first user on the basis of a background image arranged in a virtual space with reference to a position of the first user in the virtual space, and an object related to a second user arranged in the virtual space so as to maintain a relative positional relationship between the first user and the second user in the virtual space.

Effects of the Invention

As described above, according to the present disclosure, it is possible to view an image while virtually sharing the image with another user.

Note that the above-mentioned effects are not necessarily limiting, and any of the effects shown in the present specification or other effects that can be grasped from the present specification can be exerted in addition to or instead of the above-mentioned effects.

MODE FOR CARRYING OUT THE INVENTION

Figure 1:
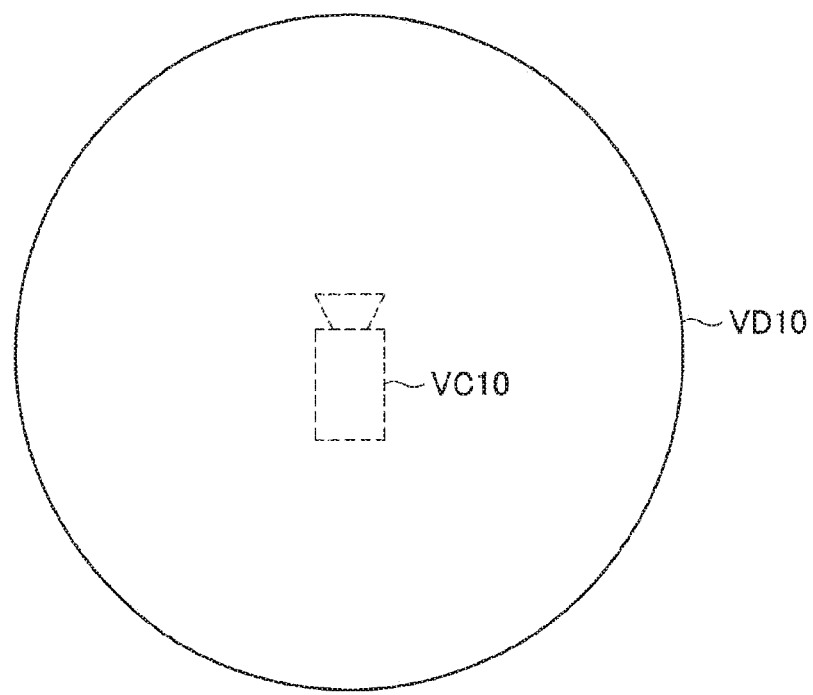
FIG. 1 is an explanatory drawing for describing identification of a field of view area in displaying an omnidirectional image on an HMD.

Hereinafter, preferred embodiments of the present disclosure will be described in detail with reference to the accompanying drawings. Note that, in the present specification and the drawings, components having substantially the same functional configuration will be assigned the same reference numerals and redundant description will be omitted.

Additionally, in the present specification and the drawings, multiple components having substantially the same functional configuration are sometimes distinguished by assigning different alphabets after the same reference numeral. However, note that, in cases where it is not necessary to distinguish each of multiple components having substantially the same functional configuration, only the same reference numeral will be assigned.

Note that the description will be given in the following order.

<<1. Background>>
<<2. Configuration>>
<2-1. Overall configuration>
<2-2. Configuration of HMD>
<<3. Operation>>
<<4. Modifications>>
<4-1. Modification 1>
<4-2. Modification 2>
<4-3. Modification 3>
<<5. Hardware configuration example>>
<<6. Conclusion>>

1. Background

Before describing an information processing system of an embodiment of the present disclosure, first, the context of creating the information processing system of the embodiment will be described.

In recent years, an omnidirectional image acquired by an omnidirectional camera or the like for capturing images in all of upper, lower, right, and left directions has been displayed. Note that, in the present specification, an image is not limited to a still image, and is used as an expression including a dynamic image. Additionally, an omnidirectional image is not limited to an image obtained by image capturing, and may be a computer-generated image (computer graphics).

The omnidirectional image is projected and displayed on a dome-like (spherical or hemispherical) screen (dome-like screen) by a projector, for example. In such a case, the central position (central position of the sphere or the hemisphere) corresponds to the camera position at the time of capturing the omnidirectional image, and thus the central position is the preferred viewing position.

Additionally, it is also possible to display an omnidirectional image on a display device mounted by a user, such as a head mounted display (HMD). For example, by cutting out, from the omnidirectional image, an image corresponding to the user's field of view (hereinafter referred to as a field of view image) identified according to the user's movement information and the like and displaying the field of view image on the HMD, the user can view the omnidirectional image while varying the viewpoint. In such a case, to cut out the field of view image from the omnidirectional image, a virtual dome-like screen (virtual dome-like screen) and a virtual camera may be arranged in a virtual space, and an image captured by the virtual camera may be cut out as the field of view image, for example.

Note that, in the present specification, an image captured by a virtual camera is sometimes expressed as an image generated (rendered) from the viewpoint of the virtual camera. Additionally, in the present specification, the position and orientation of a virtual camera VC10 are sometimes referred to as the position and direction of the viewpoint, respectively.

FIG. 1 is an explanatory drawing for describing identification of a field of view area in displaying an omnidirectional image on the HMD. In the example illustrated in FIG. 1, a virtual dome-like screen VD10 is arranged in a virtual space, and the virtual camera VC10 is arranged in the central position of the virtual dome-like screen VD10. An omnidirectional image is virtually projected on the virtual dome-like screen VD10. Note that, in the following description, virtually projecting an omnidirectional image on the virtual dome-like screen VD10 in the virtual space is sometimes expressed as arranging the omnidirectional image in the virtual space. Additionally, while FIG. 1 is illustrated in plan view for simplicity, the virtual dome-like screen VD10 may be spherical or hemispherical.

In the arrangement shown in FIG. 1, of the omnidirectional image virtually projected on the virtual dome-like screen VD10, an image generated from the viewpoint of the virtual camera VC10 is identified as a field of view image, and the field of view image is displayed on the HMD. Additionally, the orientation of the virtual camera VC10 (direction of viewpoint) may change according to movement information of the user wearing the HMD, and may change according to the orientation of the user (e.g., orientation of the user's face), for example. As a result, an area corresponding to the user's field of view (hereinafter referred to as a field of view area) imaged by the virtual camera VC10 changes according to the orientation of the user wearing the HMD.

Additionally, even in a case where the omnidirectional image is viewed with the HMD, since the central position of the virtual dome-like screen VD10 corresponds to the camera position at the time of capturing the omnidirectional image as shown in FIG. 1, with the arrangement of the virtual camera VC10 as shown in FIG. 1, the user can have an excellent view of the omnidirectional image. Hereinafter, the central position of such a virtual dome-like screen is sometimes referred to as a preferred viewing position.

According to such a configuration, even in the case of viewing the omnidirectional image displayed on the HMD, an effect similar to that in the case of viewing at the central position of the actual dome-like screen described above can be obtained. Additionally, the user is allowed to feel as if he/she moves to a space surrounded by an omnidirectional image.

Here, it is assumed that a more realistic experience is desired, such an experience in which multiple users virtually share and view an omnidirectional image, for example, or an experience in which multiple users move to a space surrounded by an omnidirectional image and have a conversation, for example.

In order to achieve such an experience, an object indicating each user (hereinafter referred to as an avatar), for example, may be displayed together with the omnidirectional image on the HMD worn by each user, for example, so that the presence of other users can be recognized. Additionally, it is also possible to achieve conversation between users by performing display and sound output such that an avatar corresponding to the user issues a message in response to the user's operation or actual generation.

Figure 2:
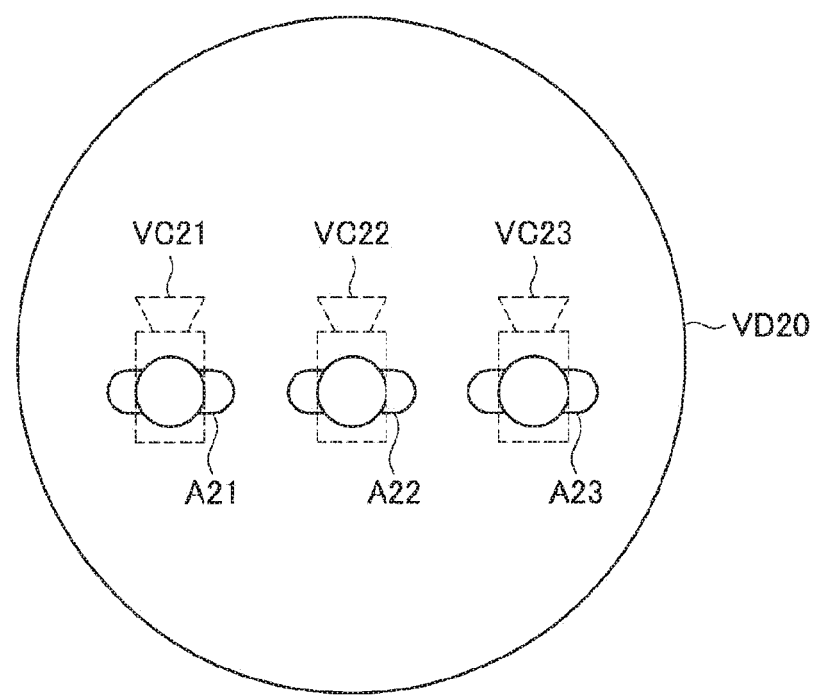
FIG. 2 is an explanatory drawing for describing an example of an experience of viewing while virtually sharing an omnidirectional image among multiple users.

FIG. 2 is an explanatory drawing for describing an example of an experience of viewing while virtually sharing an omnidirectional image among multiple users. In the example shown in FIG. 2, similar to the example shown in FIG. 1, a virtual dome-like screen VD20 is disposed in a virtual space, and an omnidirectional image is virtually projected. Additionally, in the example shown in FIG. 2, multiple avatars A21 to A23, each representing a user, are arranged inside the virtual dome-like screen VD20, and virtual cameras VC21 to VC23 are arranged in positions corresponding to the respective avatars (e.g., positions of heads of respective avatars). The orientation of the avatars A21 to A23 and the virtual cameras VC21 to VC23 may change according to the orientation of the users. According to such a configuration, a user can see another user's avatar by looking sideways, for example. That is, the omnidirectional image can be used as a background image, and a field of view image including a partial area of the omnidirectional image and an avatar of another user can be generated. Note that while virtual cameras VC21 to VC23 are illustrated in FIG. 2, the virtual cameras VC21 to VC23 are invisible, and the virtual camera VC21 to VC23 is not included in the field of view image presented to each user.

However, in the example shown in FIG. 2, only the virtual camera VC22 is arranged at the central position (preferred viewing position) of the virtual dome-like screen VD20, and the virtual camera VC21 and the virtual camera VC23 are arranged in other positions. For this reason, distortion or the like may occur in the field of view image generated from the viewpoint of the virtual camera VC21 and the virtual camera VC23. This may deteriorate viewing quality for a user who is presented with such a field of view image.

Figure 3:
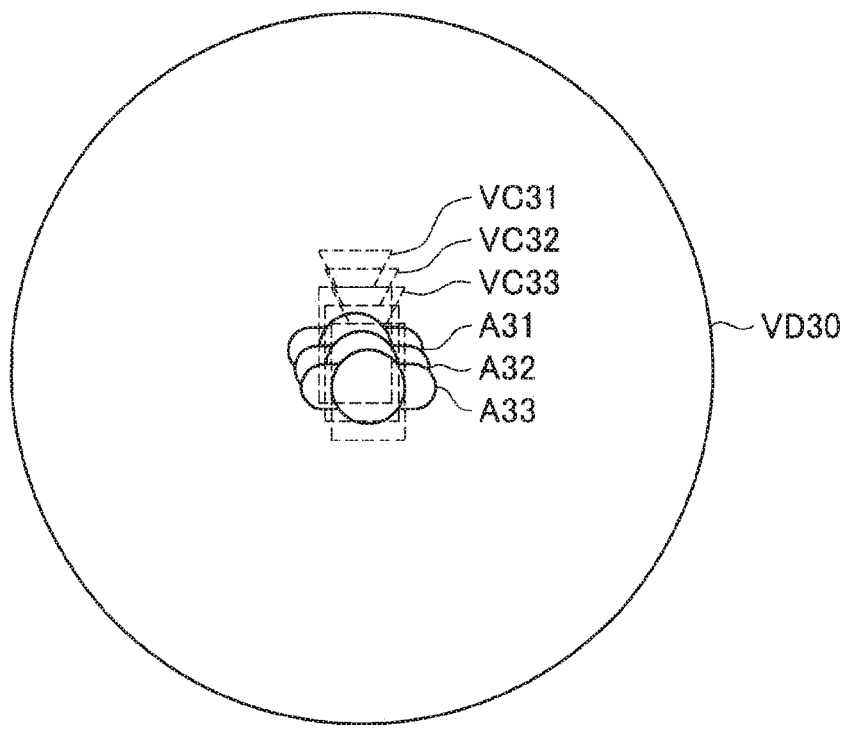
FIG. 3 is an explanatory drawing for describing an example in which all avatars and all virtual cameras are arranged in a preferred viewing position.

Hence, it may be considered to arrange all avatars and all virtual cameras in the preferred viewing position. FIG. 3 is an explanatory drawing for describing an example in which all avatars and all virtual cameras are arranged in the preferred viewing position.

As shown in FIG. 3, in a case where all avatars A31 to A33 and all virtual cameras are arranged in the central position of a virtual dome-like screen VD30, all of the users can view a field of view image generated from a viewpoint arranged in the preferred viewing position. However, since the avatars of all of the users are arranged in the same position, a user cannot see another user's avatar by looking sideways, for example, and cannot fully feel the sense of sharing the omnidirectional image with other users.

Hence, an embodiment of the present disclosure has been made in view of the above circumstance. According to the present embodiment, avatars are arranged while maintaining the relative positional relationship between users, and a field of view image generated from a viewpoint arranged in a preferred viewing position is presented to each user. With this configuration, the user can view the image with high quality while fully feeling the sense of sharing the omnidirectional image with other users. Hereinafter, a configuration and operation of an information processing system of the embodiment of the present disclosure having such an effect will be described in sequence.

2. Configuration

<2-1. Overall Configuration>

Figure 4:
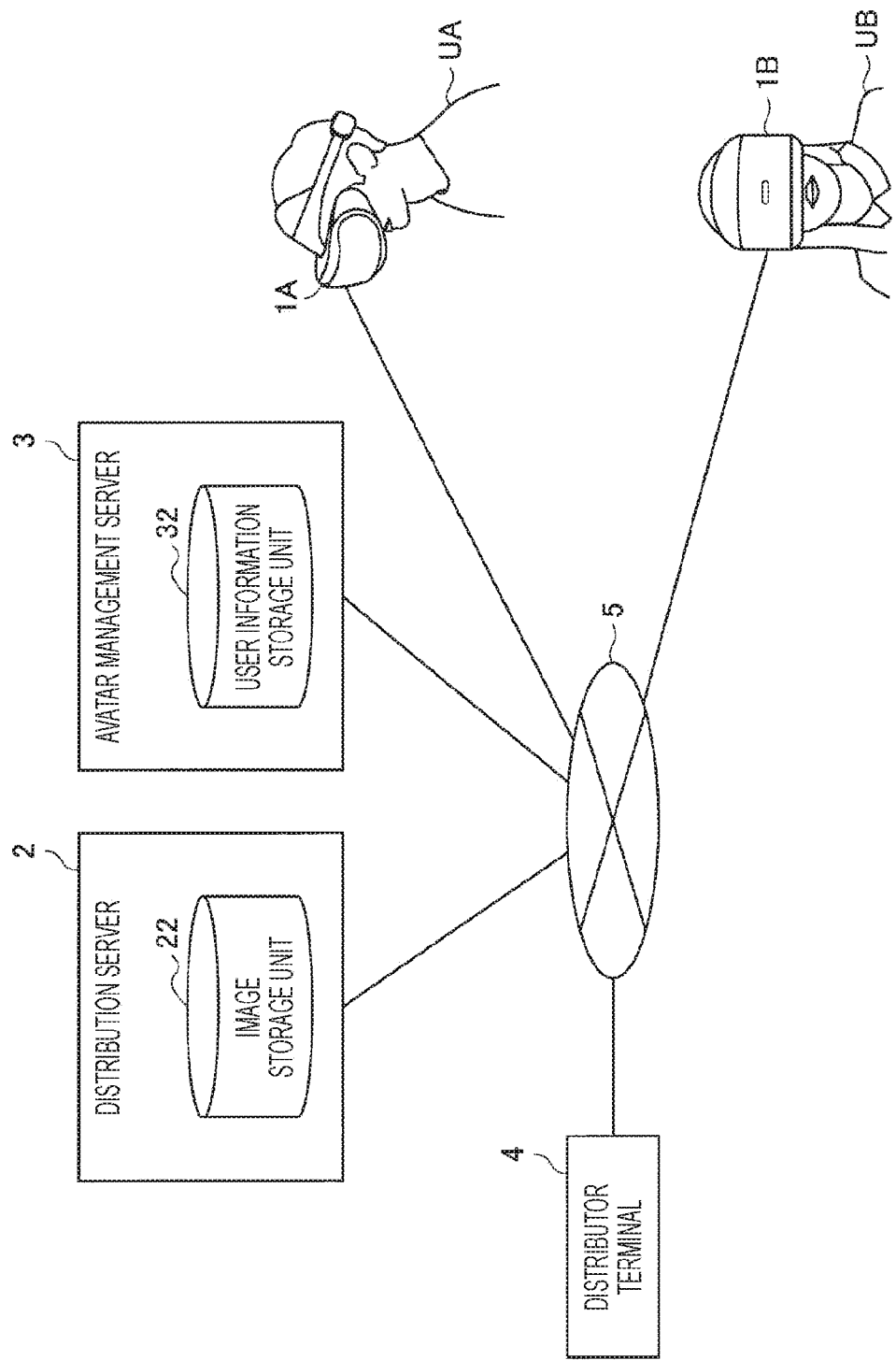
FIG. 4 is a block diagram showing a configuration example of an information processing system of an embodiment of the present disclosure.

First, an overall configuration of the information processing system of the embodiment of the present disclosure will be described with reference to FIG. 4. FIG. 4 is a block diagram showing a configuration example of the information processing system of the embodiment of the present disclosure.

As shown in FIG. 4, an information processing system 9 of the embodiment includes an HMD1, a distribution server 2, an avatar management server 3, a distributor terminal 4, and a communication network 5.

The HMD1 is an information processing device worn by a user. Hereinafter, the user wearing the HMD1 is sometimes referred to as the wearing user of the HMD1. In the example shown in FIG. 1, since a user UA wears an HMD1A and a user UB wears an HMD1B, the wearing user of the HMD1A is the user UA and the wearing user of the HMD1B is the user UB.

The HMD1 is connected to the communication network 5, receives an omnidirectional image (an example of background image) from the distribution server 2, and receives information (user information) regarding users including other users from the avatar management server 3. Additionally, the HMD1 transmits, to the avatar management server 3, information regarding the user wearing the HMD1.

Moreover, the HMD1 displays a field of view image generated from the viewpoint of a preferred viewing position, on the basis of the omnidirectional image (an example of background image) arranged in a virtual space and an avatar arranged in the virtual space on the basis of the user information. A more detailed configuration of the HMD1 will be described later with reference to FIG. 6.

As shown in FIG. 4, the distribution server 2 is an information processing device having an image storage unit 22. The distribution server 2 distributes (sends) the omnidirectional image to the HMD1A and the HMD1B through the communication network 5. For example, the distribution server 2 may distribute an omnidirectional image received from the distributor terminal 4 through the communication network 5 to the HMD1, or may distribute an omnidirectional image stored in the image storage unit 22 to the HMD1.

Note that the image storage unit 22 may store (accumulate) an omnidirectional image received from the distributor terminal 4 through the communication network 5, or may store an omnidirectional image prepared in advance. Additionally, while FIG. 4 shows an example in which the distribution server 2 has the image storage unit 22, the embodiment is not limited to such an example, and the image storage unit 22 may be included in another device connected to the communication network 5, for example.

As shown in FIG. 4, the avatar management server 3 has a user information storage unit 32. The avatar management server 3 manages user information on the basis of information acquired by the HMD1 and received from the HMD1 through the communication network 5, and stores the user information in, for example, the user information storage unit 32. Note that while FIG. 4 shows an example in which the avatar management server 3 has the user information storage unit 32, the embodiment is not limited to such an example, and the user information storage unit 32 may be included in another device connected to the communication network 5, for example.

Additionally, the avatar management server 3 transmits user information regarding users including users other than the wearing user of the HMD1, to the HMD1 through the communication network 5. The avatar management server 3 may transmit real-time user information to the HMD1, or may transmit past user information (history of user information) to the HMD1. Note that real-time user information as used herein refers to information regarding a user who is currently viewing, and is not limited strictly to information regarding the user at the current time. Hence, real-time user information may include user information acquired after a delay by communication or a delay resulting from processing of the avatar management server 3, for example.

User information may include behavioral information regarding the behavior of the wearing user of the HMD1, a relative position management coordinate system indicating a relative positional relationship (relative positional relationship) among the users, and a message transmitted by the user, which are acquired by the HMD 1. User information may be stored in the user information storage unit 32 in chronological order, and such a configuration allows the avatar management server 3 to transmit past user information to the HMD1.

Behavioral information may include posture information regarding the posture of the wearing user of the HMD1. For example, posture information includes information regarding the posture of the head, arm, hand, and foot of the wearing user, and the facial expression of the wearing user.

Additionally, behavioral information may include information regarding the positional movement of the wearing user of the HMD1. The avatar management server 3 manages the relative position management coordinate system on the basis of information regarding the positional movement of the user, for example.

The relative position management coordinate system is a coordinate system for managing the relative positional relationship among users independently of the virtual space managed by each HMD1. Note that the relative position management coordinate system includes not only the relative position among the users but also information regarding the relative orientation among the users. Additionally, as will be described later, the HMD1 arranges the avatars of the users on the basis of the relative position management coordinate system.

Figure 5:
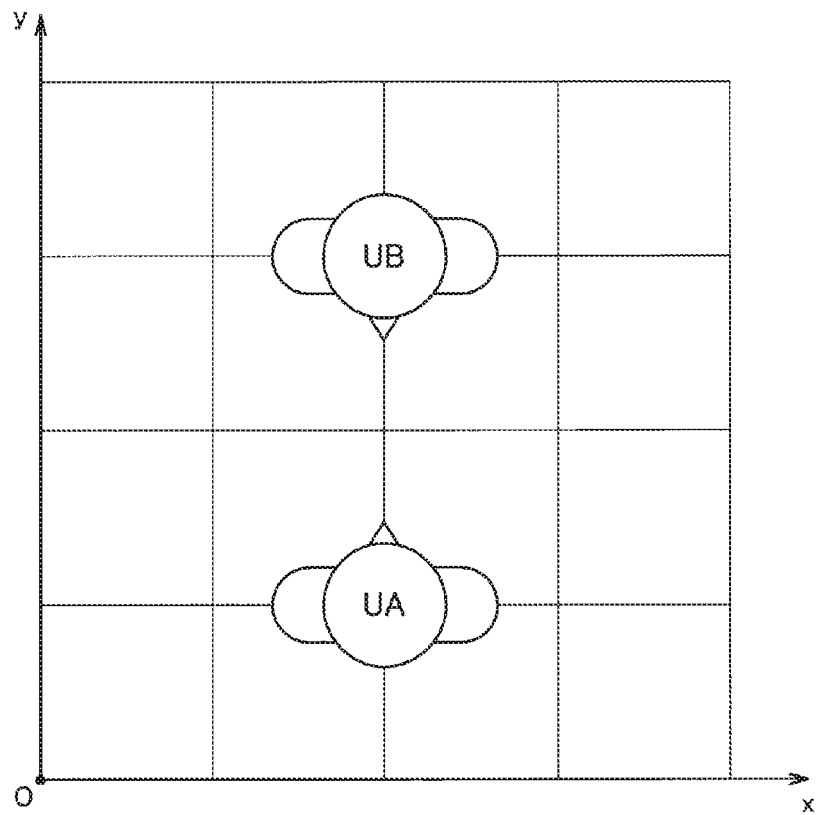
FIG. 5 is an explanatory drawing showing a specific example of a relative position management coordinate system.

FIG. 5 is an explanatory drawing showing a specific example of the relative position management coordinate system. As shown in FIG. 5, the position and orientation of the user UA, and the position and orientation of the user UB are managed by the avatar management server 3 in the relative position management coordinate system.

For example, the avatar management server 3 may update the relative position management coordinate system according to information regarding the positional movement of the wearing user received from the HMD1, for example. For this reason, the relative positional relationship between the user UA (first user) and the user UB (second user) may change according to the positional movement of the user UA or the user UB, for example.

Additionally, the avatar management server 3 may determine the initial position and the initial orientation of each user in the relative position management coordinate system on the basis of user information stored in the user information storage unit 32, that is, past user information, for example. For this reason, the relative positional relationship between the user UA (first user) and the user UB (second user) may be identified on the basis of past user information, for example.

For example, the avatar management server 3 may set, on the basis of past user information, a position and an orientation of a user in the relative position management coordinate system at the time of his/her last viewing as the initial position and the initial orientation of the user in the relative position management coordinate system. Additionally, the avatar management server 3 may set, on the basis of past user information, the average position and the average orientation of all the past users as the initial position and the initial orientation of a user. According to such a configuration, it is possible to set the position and the orientation in which many users have been excited in the past as the initial position and the initial orientation.

Note that the embodiment is not limited to such an example, and the avatar management server 3 may randomly set the initial position and the initial orientation of each user in the relative position management coordinate system, or the initial position and the initial orientation may be set by using a predetermined position and orientation.

A message sent by the user may be text data or voice data, for example. Note that text data may be converted into speech data by speech synthesis technology, or speech data may be converted into text data by speech recognition technology.

The message sent by the user is transmitted from the HMD1 to the avatar management server 3, and then transmitted from the avatar management server 3 to the HMD1 owned by the user who is the transmission target. Note that it is also possible to send a message to all the users, and it is also possible to send a message to a specific user. Note that the message may be transmitted directly from the HMD1 to another HMD1 without passing through the avatar management server 3.

The distributor terminal 4 acquires an omnidirectional image, and transmits it to the distribution server 2 through the communication network 5. For example, the distributor terminal 4 may have an imaging unit and acquire an omnidirectional image on the basis of imaging by the imaging unit, or may acquire an omnidirectional image on the basis of imaging by an unillustrated imaging device connected to the distributor terminal 4. Additionally, the distributor terminal 4 may acquire an omnidirectional image by performing image processing such as stitching on an image obtained by imaging.

The communication network 5 is a wired or wireless transmission path of information transmitted from a device or system connected to the communication network 5. For example, the communication network 5 may include the Internet, a public network such as a telephone network and a satellite communication network, various local area networks (LANs) including Ethernet (registered trademark), a wide area network (WAN), or the like. Additionally, the communication network 5 may also include a leased line network such as an internet protocol-virtual private network (IP-VPN).

<2-2. Configuration of HMD>

Figure 6:
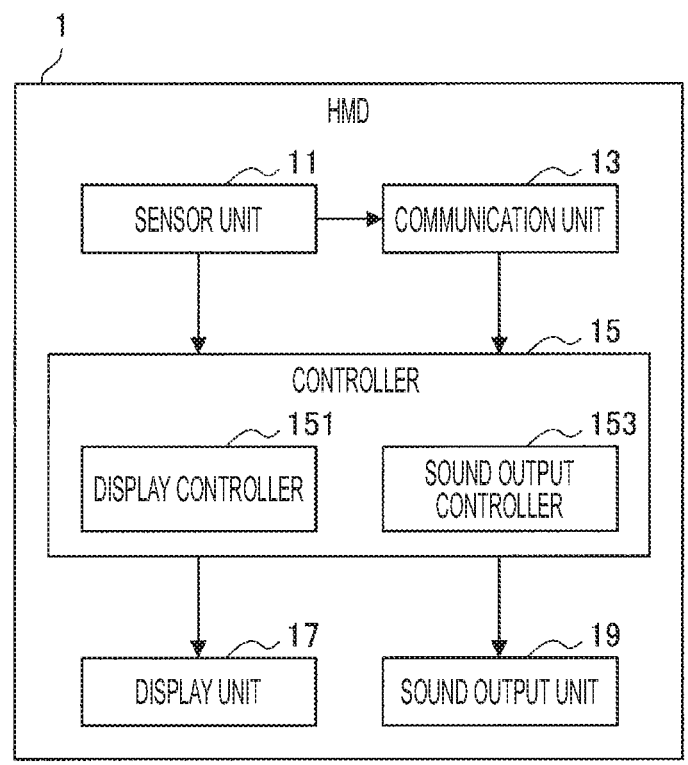
FIG. 6 is a block diagram showing a configuration example of an HMD1 of the embodiment.

Hereinabove, the overall configuration of the information processing system 9 of the embodiment has been described. Subsequently, a configuration of the HMD1 included in the information processing system 9 will be described with reference to FIG. 6. FIG. 6 is a block diagram showing a configuration example of the HMD1 of the embodiment.

As shown in FIG. 6, the HMD1 is an information processing device including a sensor unit 11, a communication unit 13, a controller 15, a display unit 17, and a sound output unit 19.

The sensor unit 11 acquires behavioral information regarding the behavior of the wearing user of the HMD1 by sensing. The sensor unit 11 may include, for example, an acceleration sensor, a gyro sensor, a camera, a microphone, a geomagnetic sensor, a distance measurement sensor, a force sensor, and the like.

For example, the sensor unit 11 may acquire posture information regarding the wearing user's head posture (face orientation, head angle, and the like), arm, hand, foot posture, and facial expression as behavioral information. Note that the facial expression of the wearing user may be acquired by a camera (an example of sensor unit 11) arranged inside the HMD1. Additionally, the sensor unit 11 may acquire speech of the user as behavioral information. The sensor unit 11 may acquire information regarding the positional movement of the user as behavioral information.

Note that behavioral information is not limited to the example of being acquired by the sensor unit 11 of the HMD1 and may be acquired by an external sensor or input device (such as a controller) connected to the HMD1. For example, information regarding the positional movement of the user may be acquired by a camera or an input device operated by the wearing user arranged outside the HMD1. Additionally, posture information regarding the posture of the user's arm, hand, and foot may be acquired by a camera or a distance measurement sensor arranged outside the HMD1.

The communication unit 13 is a communication interface that mediates communication between the HMD1 and another device. The communication unit 13 supports any wireless communication protocol or wired communication protocol, and establishes a communication connection with another device directly or through the communication network 5 described with reference to FIG. 4, for example. For example, the communication unit 13 transmits, to the avatar management server 3, user information acquired by the sensor unit 11 or another sensor or input device connected to the HMD1. Additionally, the communication unit 13 receives an omnidirectional image from the distribution server 2. Moreover, the communication unit 13 receives, from the avatar management server 3, user information also including information regarding other users (users other than wearing user of HMD1). Note that the user information that the communication unit 13 receives from the avatar management server 3 may include behavioral information on another user, a relative position management coordinate system, and a message sent by the other user.

Additionally, the communication unit 13 may receive information from a sensor or input device outside the HMD1 and transmit the received information to the avatar management server 3. For example, the communication unit 13 may receive information regarding the positional movement of the user from an external sensor or input device, and transmit the information to the avatar management server 3. Additionally, the communication unit 13 may receive a message that the user of the HMD1 desires to send from an external input device, and transmit the message to the avatar management server 3 or to another HMD1.

The controller 15 controls the operation of each configuration of the HMD1. Additionally, as shown in FIG. 6, the controller 15 also functions as a display controller 151 and a sound output controller 153.

The display controller 151 controls display for the wearing user (first user) of the HMD1, that is, display of the display unit 17, on the basis of the omnidirectional image (background image) and the user information received by the communication unit 13.

For example, the display controller 151 arranges the omnidirectional image and the avatar of each user (object representing each user) in the virtual space, and generates a field of view image from a viewpoint arranged in a position (such as head position) corresponding to the position of the wearing user (first user) in the virtual space. Then, the display controller 151 causes the display unit 17 to display the field of view image.

The display controller 151 arranges, on the basis of the relative position management coordinate system received by the communication unit 13 from the avatar management server 3, the avatar of each user in the virtual space so as to maintain the relative positional relationship among the users in the virtual space. Note that the avatars arranged by the display controller 151 may include not only avatars of other users but also the avatar of the wearing user. That is, the display controller 151 may control the display also on the basis of the avatar of the wearing user (first user). According to such a configuration, the wearing user can view his/her own avatar, and the immersion feeling is improved, for example.

Additionally, the display controller 151 may control, on the basis of user information, an avatar of a user corresponding to the user information. For example, the display controller 151 may control the posture of the avatar of each user on the basis of posture information of each user. Here, posture information of each user may include the above-described head posture (face orientation, head angle, and the like) and arm, hand, and foot posture, for example. According to such a configuration, it is possible for the user to obtain a stronger sense of sharing the omnidirectional image and the virtual space with other users.

Moreover, the display controller 151 arranges the omnidirectional image in the virtual space with reference to the position of the wearing user (i.e., position of avatar of wearing user) in the virtual space. Note that the arrangement of the omnidirectional image in the virtual space may be performed by arranging a virtual dome-like screen for projecting the omnidirectional image in the virtual space, for example.

Figure 7:
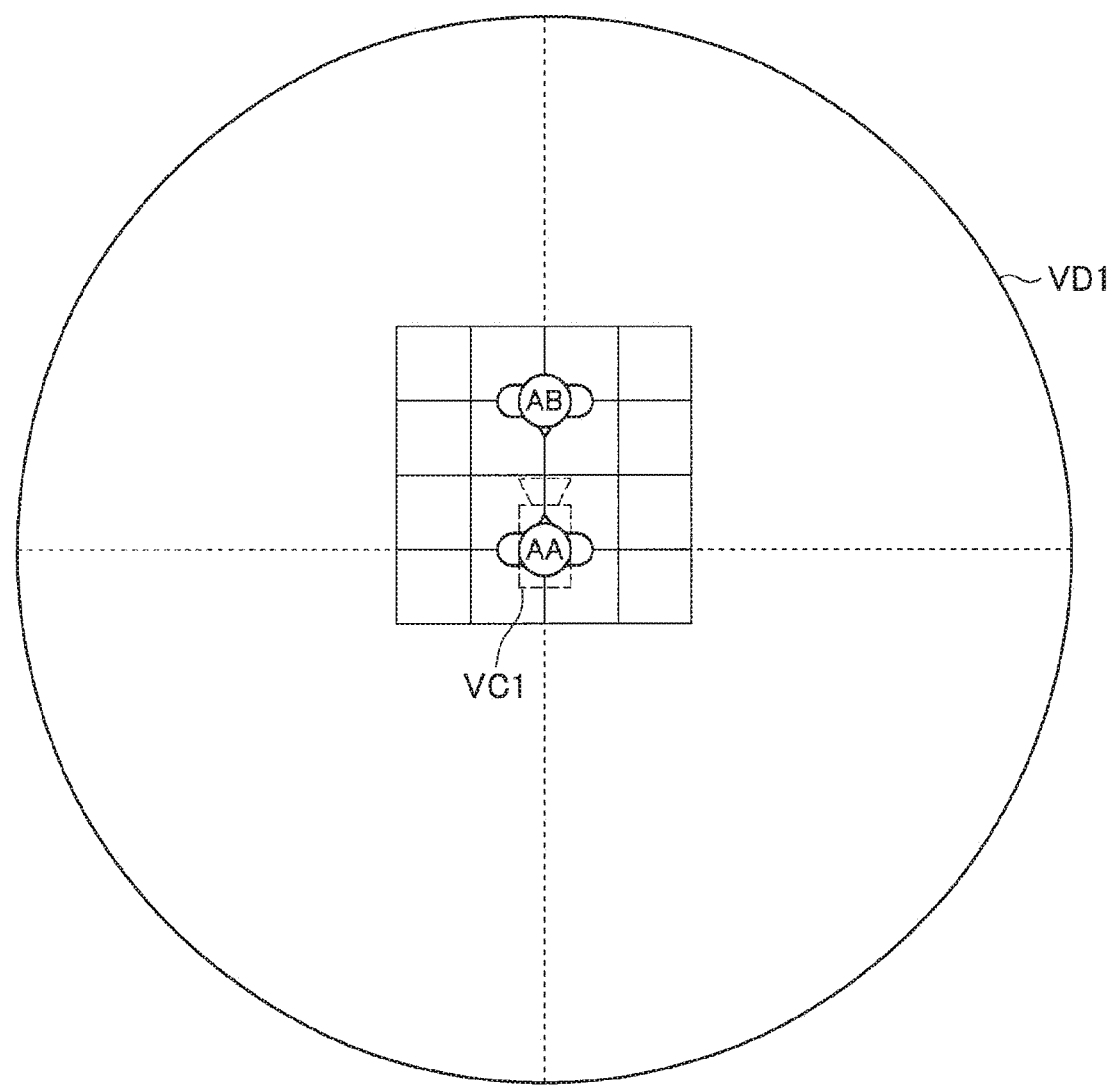
FIG. 7 is an explanatory drawing showing an example of the arrangement of avatars and a virtual dome-like screen in a virtual space of the embodiment.
Figure 8:
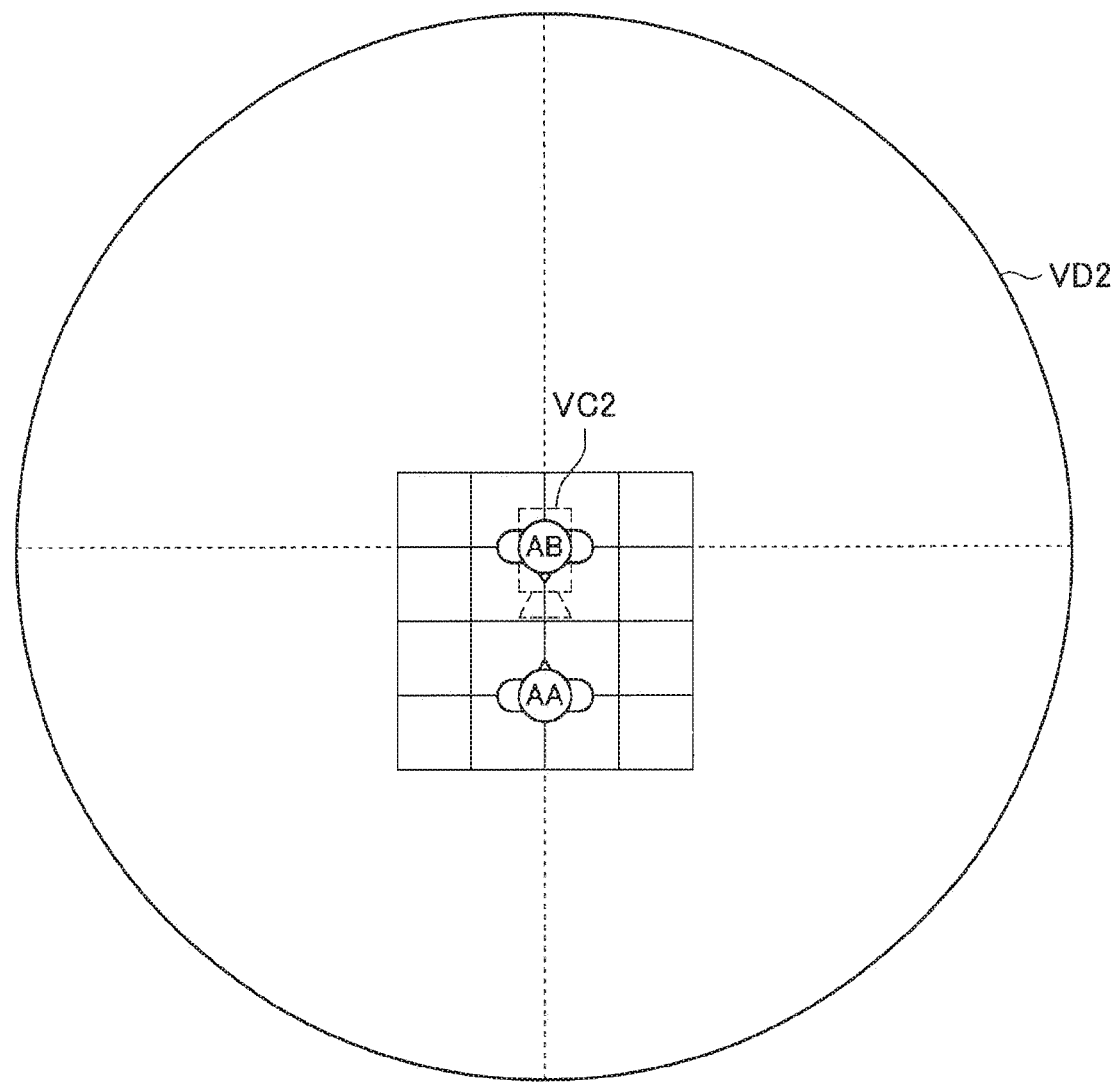
FIG. 8 is an explanatory drawing showing an example of the arrangement of the avatars and the virtual dome-like screen in the virtual space of the embodiment.

FIGS. 7 and 8 are explanatory drawings showing an example of the arrangement of avatars and a virtual dome-like screen in a virtual space. Note that FIG. 7 illustrates the virtual space set by the display controller 151 of the HMD1A worn by the user UA, and FIG. 8 illustrates the virtual space set by the display controller 151 of the HMD1B worn by the user UB. That is, the wearing user (first user) in FIG. 7 is the user UA, and the wearing user (first user) in FIG. 8 is the user UB.

As shown in FIG. 7, the display controller 151 of the HMD1A arranges an avatar AA of the user UA and an avatar AB of the user UB so as maintain the relative positional relationship between the users in the virtual space, on the basis of the relative position management coordinate system described with reference to FIG. 5. Additionally, the display controller 151 of the HMD1A arranges the omnidirectional image (i.e., arranges virtual dome-like screen VD1) with reference to the position of the user UA (position of avatar AA) who is the wearing user (first user).

More specifically, the display controller 151 of the HMD1A arranges the omnidirectional image, so that the position of the virtual camera VC1 as the viewpoint is a predetermined preferred viewing position. In the embodiment, since the preferred viewing position is the central position of the virtual dome-like screen VD1, the virtual dome-like screen VD1 is arranged such that the position of the virtual camera VC1 specified according to the position of the user UA in the virtual space (e.g., head position of avatar AA) is at the center. Note that the preferred viewing position is not limited to the central position of the virtual dome-like screen VD1, and the preferred viewing position may be set as appropriate.

Additionally, as shown in FIG. 8, the display controller 151 of the HMD1B similarly arranges the avatar AA of the user UA and the avatar AB of the user UB in the virtual space so as maintain the relative positional relationship between the users in the virtual space, on the basis of the relative position management coordinate system described with reference to FIG. 5. Additionally, the display controller 151 of the HMD1B arranges the omnidirectional image (i.e., arranges virtual dome-like screen VD2) in the virtual space with reference to the position of the user UB (position of avatar AB) who is the wearing user (first user).

Additionally, similar to the display controller 151 of the HMD1A, the display controller 151 of the HMD1B arranges the omnidirectional image in the virtual space, so that the position of the virtual camera VC2 as the viewpoint is a predetermined preferred viewing position. For example, the virtual dome-like screen VD2 is arranged such that the position of the virtual camera VC2 specified according to the position of the user UB in the virtual space (e.g., head position of avatar AB) is at the center.

According to such a configuration, each user can view the field of view image generated from the viewpoint of the preferred viewing position, and can also view the avatar of another user.

In addition, the display controller 151 may control the direction of the viewpoint (orientation of virtual camera VC1) in accordance with the orientation of the wearing user (first user). Note that the information on the orientation of the wearing user may be provided from the sensor unit 11 or may be provided from the avatar management server 3.

Figure 9:
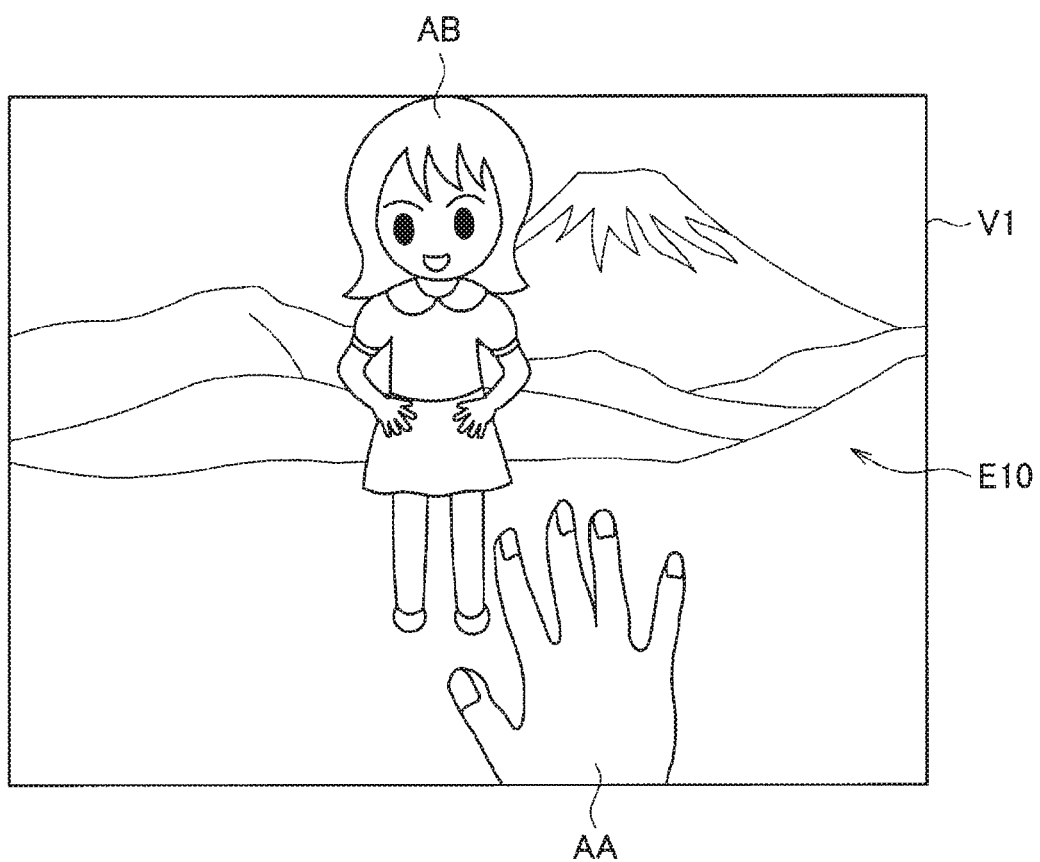
FIG. 9 is an explanatory drawing showing an example of a field of view image V1 generated from the viewpoint of a virtual camera VC1 shown in FIG. 7.

FIG. 9 is an explanatory drawing showing an example of the field of view image V1 generated from the viewpoint of the virtual camera VC1 shown in FIG. 7. That is, the field of view image V1 of FIG. 9 is displayed on the HMD1A worn by the user UA.

As shown in FIG. 9, the field of view image V1 includes the avatar AB of the user UB and a part of an omnidirectional image E10. Additionally, as shown in FIG. 9, the field of view image V1 may include a part (hand) of the avatar AA of the user UA who is the wearing user.

Note that while an example in which there is only one user other than the wearing user has been described in FIGS. 7 to 9, a case where there are other multiple users is handled similarly. That is, avatars of other multiple users may be arranged in a virtual space, and the field of view image may include avatars of other multiple users.

Additionally, the display controller 151 may arrange and display the avatar in the virtual space on the basis of past user information received from the avatar management server 3. For example, in a case where the omnidirectional image is a dynamic image, the avatar may be arranged and displayed in the virtual space on the basis of past user information which is not viewed at the same time but the reproduction time of the moving image is the same. According to such a configuration, since avatars of users who are not viewing at the same time can also be displayed, it is possible to obtain a sense of unity with other users even when there are few users viewing at the same time.

Note that the display controller 151 may control the display so that an avatar based on real-time user information (avatar of user who is viewing simultaneously) is distinguished from an avatar based on past user information. For example, the display controller 151 may control the display such that an avatar based on real-time user information is emphasized. For example, the display controller 151 may emphasize the avatar based on real-time user information by enhancing transparency of the avatar based on past user information, or may emphasize the avatar based on real-time user information by displaying an effect around the avatar based on real-time user information. Additionally, the display controller 151 may control the display such that an avatar based on real-time user information is emphasized. Additionally, the display controller 151 may display distinguishable information (e.g., an icon) near one or both of the avatar based on real-time user information and the avatar based on past user information.

According to such a configuration, it is possible to easily distinguish the avatar of the user who is viewing at the same time. As will be described later, since it is possible to communicate with the user who is viewing at the same time, the emphasized display makes it possible to determine whether it is possible to communicate with the user corresponding to the avatar.

Additionally, the display controller 151 may perform display control regarding communication between users. For example, the display controller 151 may display a message sent by another user (second user). For example, the display controller 151 may display a message at a position (e.g., near face of avatar of the user) corresponding to the position of the user who sent the message.

In addition, the display controller 151 may control the display such that when another user (second user) sends a message to the wearing user (first user), an avatar (hereinafter referred to as a message sending avatar) of the other user (second user) who sent the message is emphasized. For example, the display controller 151 may emphasize the message sending avatar by enhancing transparency of avatars other than the message sending avatar, or displaying an effect around the message sending avatar. According to such a configuration, even in a case where many avatars are displayed, for example, it is possible to easily recognize the avatar who sent the message. In particular, when displaying avatars on the basis of past user information as described above, many avatars are easily displayed and, therefore, such emphasized display becomes more effective.

The sound output controller 153 controls sound output by the sound output unit 19. For example, the sound output controller 153 may control the sound output unit 19 to acoustically output a message sent by another user (second user). Additionally, the sound output controller 153 may control sound output by the sound output unit 19 so that a message can be heard from the position of the avatar of another user (second user) who sent the message. According to such a configuration, it is possible for the wearing user to more strongly feel as if there are other users nearby.

The display unit 17 is controlled by the display controller 151 to perform display for the wearing user of the HMD1. For example, the display unit 17 may be capable of presenting different images to each eye of the wearing user, and may be capable of presenting three-dimensional view of the virtual space described above.

The sound output unit 19 is controlled by the sound output controller 153 to perform sound output. The sound output unit 19 may include multiple speakers, for example, and the sound output unit 19 may be capable of outputting sound (three-dimensional sound) in a three-dimensional manner.

3. Operation

Figure 10:
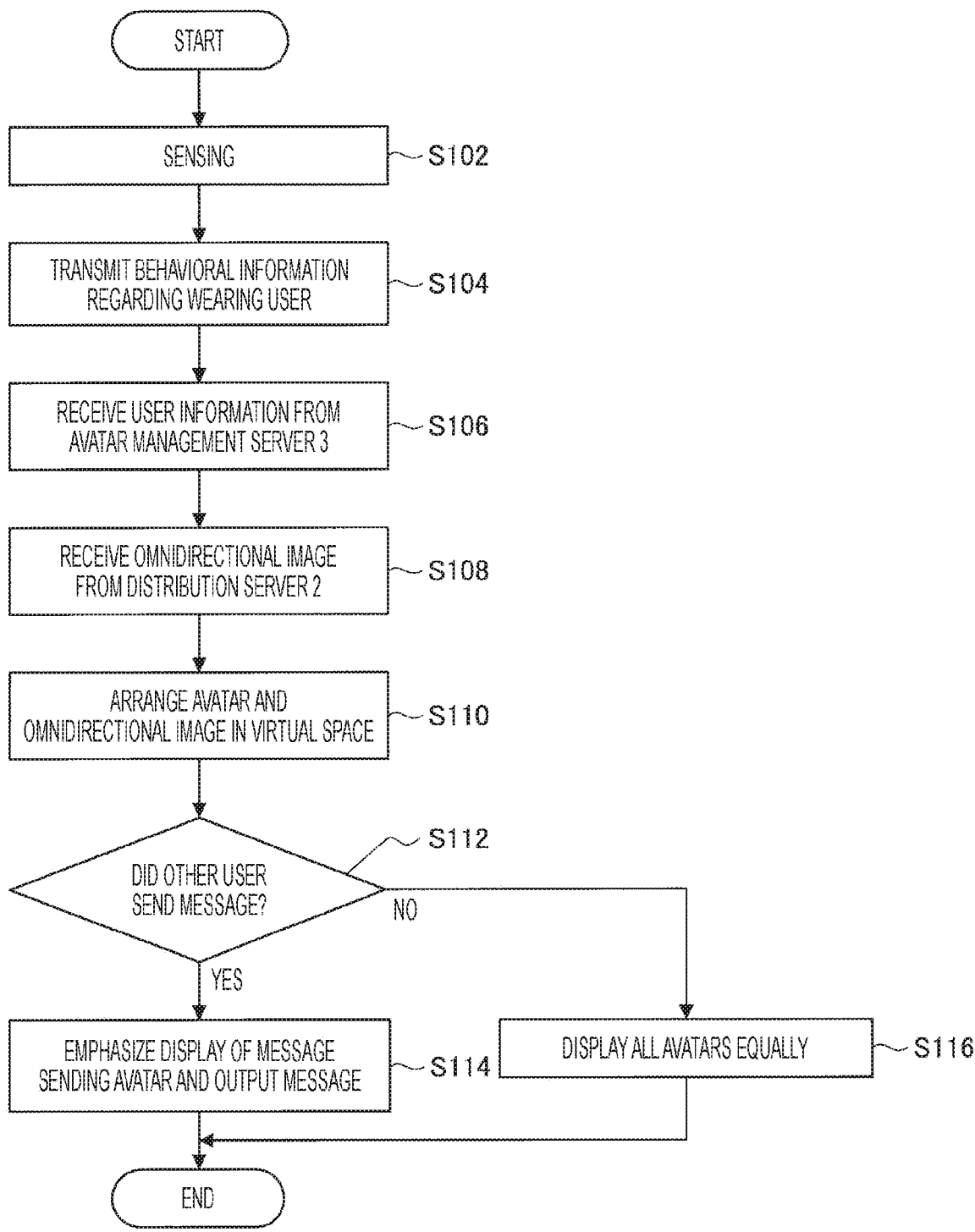
FIG. 10 is a flowchart showing an operation example of the HMD1 of the embodiment.

Hereinabove, configuration examples of the information processing system 9 and the HMD1 of the embodiment have been described. Subsequently, an operation of the HMD1 of the embodiment will be described with reference to FIG. 10. FIG. 10 is a flowchart showing an operation example of the HMD1 of the embodiment.

As shown in FIG. 10, first, the sensor unit 11 or a sensor connected to the HMD1 acquires behavioral information regarding the behavior of the wearing user by sensing (S102). Subsequently, the communication unit 13 transmits the acquired behavioral information to the avatar management server 3 (S104), and receives user information regarding the user including other users from the avatar management server 3 (S106). Moreover, the communication unit 13 receives an omnidirectional image from the distribution server 2 (S108).

Subsequently, the display controller 151 arranges the avatars of the users and the omnidirectional image in the virtual space on the basis of the user information (S110). Here, if a message is sent by another user (YES in S112), the display controller 151 emphasizes the display of the avatar (message sending avatar) of the user who sent the message, and displays a message on the display unit 17 (S114). Note that the message may be acoustically output from the sound output unit 19 instead of or in addition to the display output by the display unit 17.

On the other hand, if there is no message sent by another user (NO in S112), the display controller 151 causes all avatars to be displayed equally (S116). Note that, in steps S114 and S116, as described above, the display controller 151 causes the field of view image generated from the viewpoint arranged in the preferred viewing position in the virtual space to be displayed.

Hereinabove, the operation example of the HMD1 of the embodiment has been described. Note that the processing shown in FIG. 10 may be repeated as appropriate.

4. Modifications

Hereinabove, an embodiment of the present disclosure has been described. In the following, some modifications of the embodiment will be described. Note that each modification described below may be applied to the present embodiment independently, or may be applied to the embodiment by combination. Additionally, each modification may be applied instead of the configuration described in the embodiment, or may be applied in addition to the configuration described in the embodiment.

<4-1. Modification 1>

In the above embodiment, an example in which the display controller 151 controls the posture of the avatar of the user on the basis of the posture information of the user has been described. However, the present technology is not limited to such an example. For example, in a case where posture information regarding the posture of another user (second user) satisfies a predetermined condition, the display controller 151 may control the posture of the avatar of the other user also on the basis of the omnidirectional image arranged in the virtual space. Such an example will be described as Modification 1 with reference to FIGS. 11 to 15. FIGS. 11 to 15 are explanatory drawings for describing Modification 1.

Figure 11:
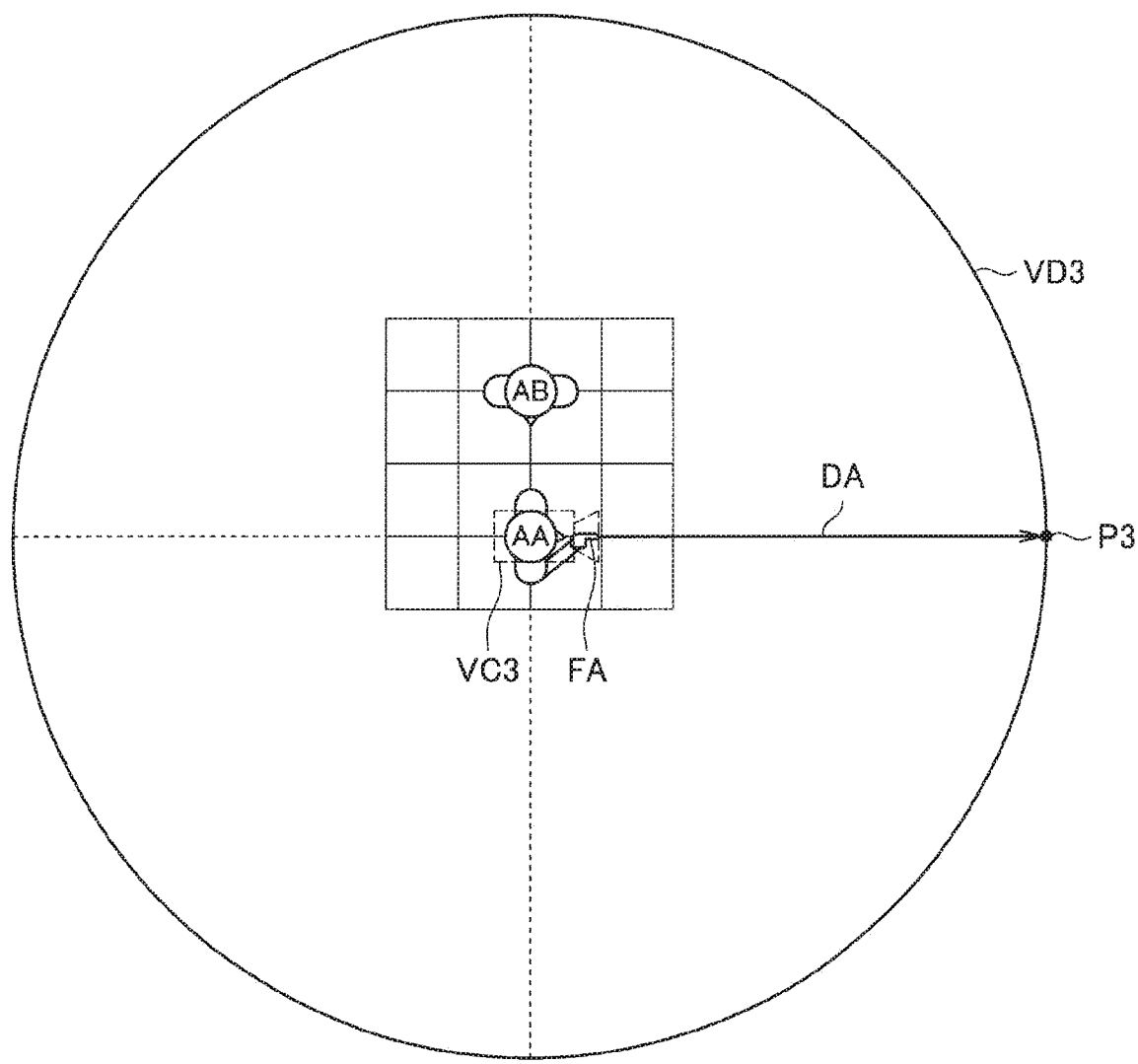
FIG. 11 is an explanatory drawing for describing Modification 1.

First, a virtual space set by an HMD1A worn by a user UA will be considered. In FIG. 11, the wearing user (first user) is the user UA, and a virtual camera VC3 is arranged according to the position of the user UA. As shown in FIG. 11, when a finger FA of an avatar AA of the user UA is directed in a pointing direction DA, the wearing user is considered to want to point at a point P3 of an omnidirectional image projected on a dome-like screen VD3.

Figure 12:
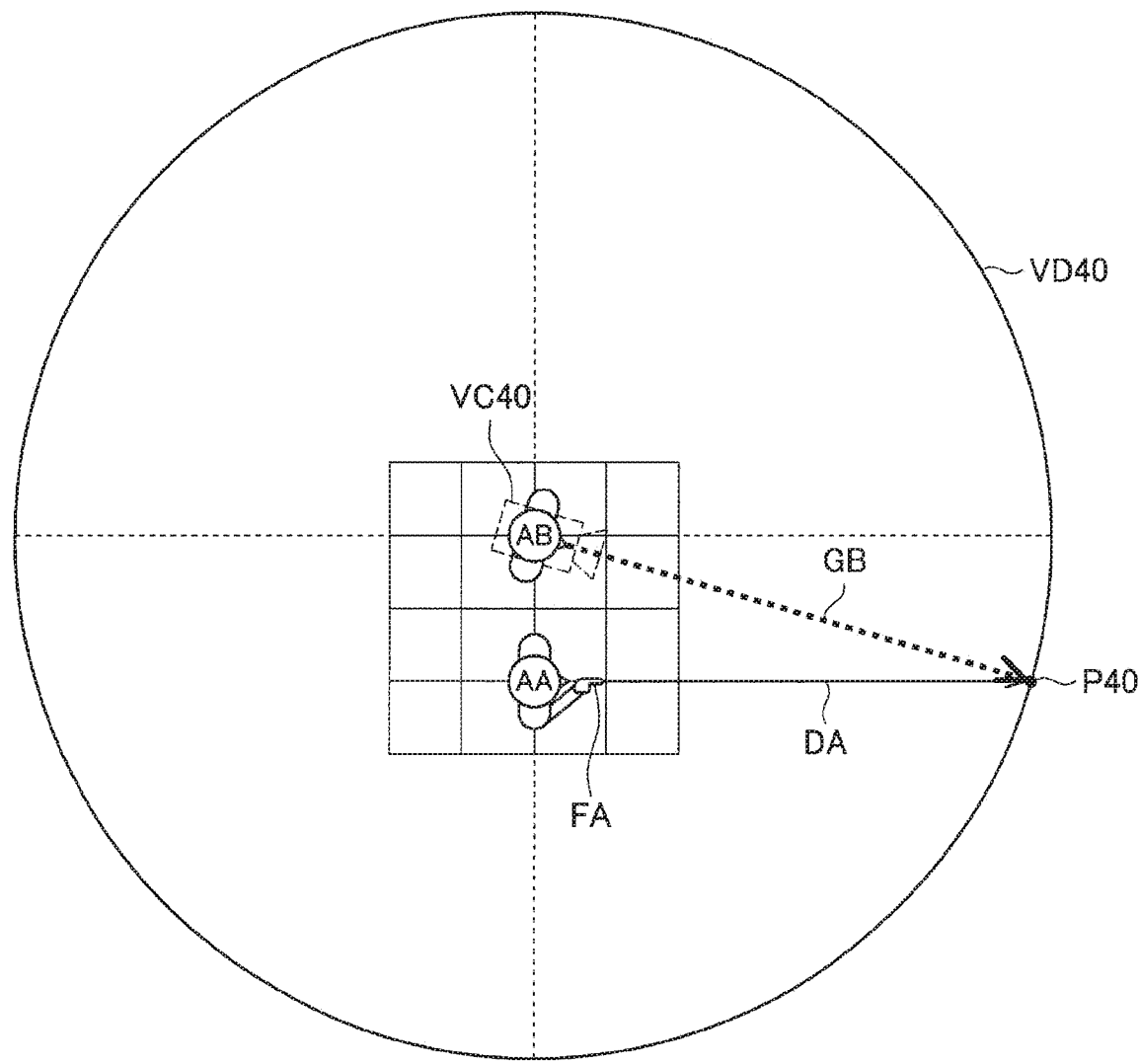
FIG. 12 is an explanatory drawing for describing Modification 1.

Here, a virtual space set by an HMD1B worn by a user UB in a case where the control according to the present modification is not performed will be considered. In FIG. 12, the wearing user is the user UB, and a virtual camera VC40 is arranged according to the position of the user UB. As shown in FIG. 12, when the avatar AA of the user UA is arranged according to the posture of the user UA, the finger FA of the avatar AA is directed in the direction DA as shown in FIG. 12. For this reason, it is recognized by the user UB that the user UA points at a point P40 of the omnidirectional image projected on a dome-like screen VD40, and a line-of-sight GB of an avatar AB of the user UB (i.e., line-of-sight of user UB) heads toward the point P40.

However, comparing FIG. 11 with FIG. 12, it can be seen that the user UB is looking at a point different from the point that the user UA originally wanted to point at. Hence, in a case where it is determined that another user (second user) is pointing (an example of predetermined condition), a display controller 151 may control the posture of the other user also on the basis of the omnidirectional image. Note that a case of pointing to a certain position of the omnidirectional image not only by a finger but also by an object, an arm, or the like is handled similarly.

For example, the display controller 151 of the present modification may control the posture of the avatar of the other user such that the avatar of the other user points at a position that the other user wants to point at, on the basis of posture information on the other user and the arranged omnidirectional image. Note that it is possible to identify the position that the other user wants to point at, by an intersection of the pointing direction in the virtual space set by the HMD worn by the other user and the dome-like screen, for example.

Figure 13:
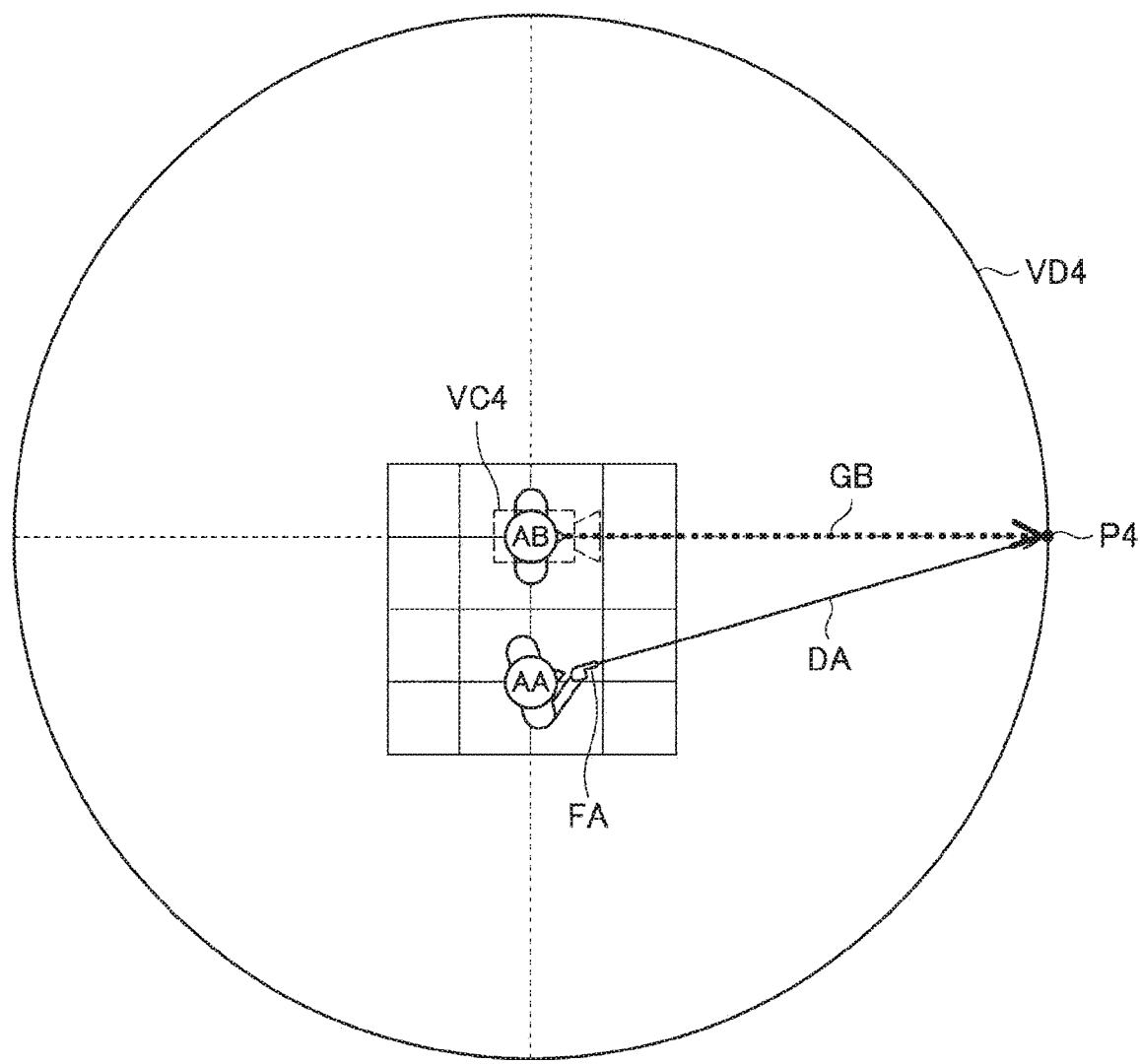
FIG. 13 is an explanatory drawing for describing Modification 1.

FIG. 13 shows a control example of the avatar of the other user by the display controller 151 according to the above-described modification. Note that, in FIG. 13, the wearing user is a user UB, and a virtual camera VC4 is arranged according to the position of the user UB. As shown in FIG. 13, a line-of-sight GB of an avatar AB of the user UB, i.e., line-of-sight of user UB), is directed to a point P4 of a dome-like screen VD4. Here, the point P4 corresponds to the point P3 shown in FIG. 11, and the user UB can view the position in the omnidirectional image that the user UA wanted to point at.

Figure 14:
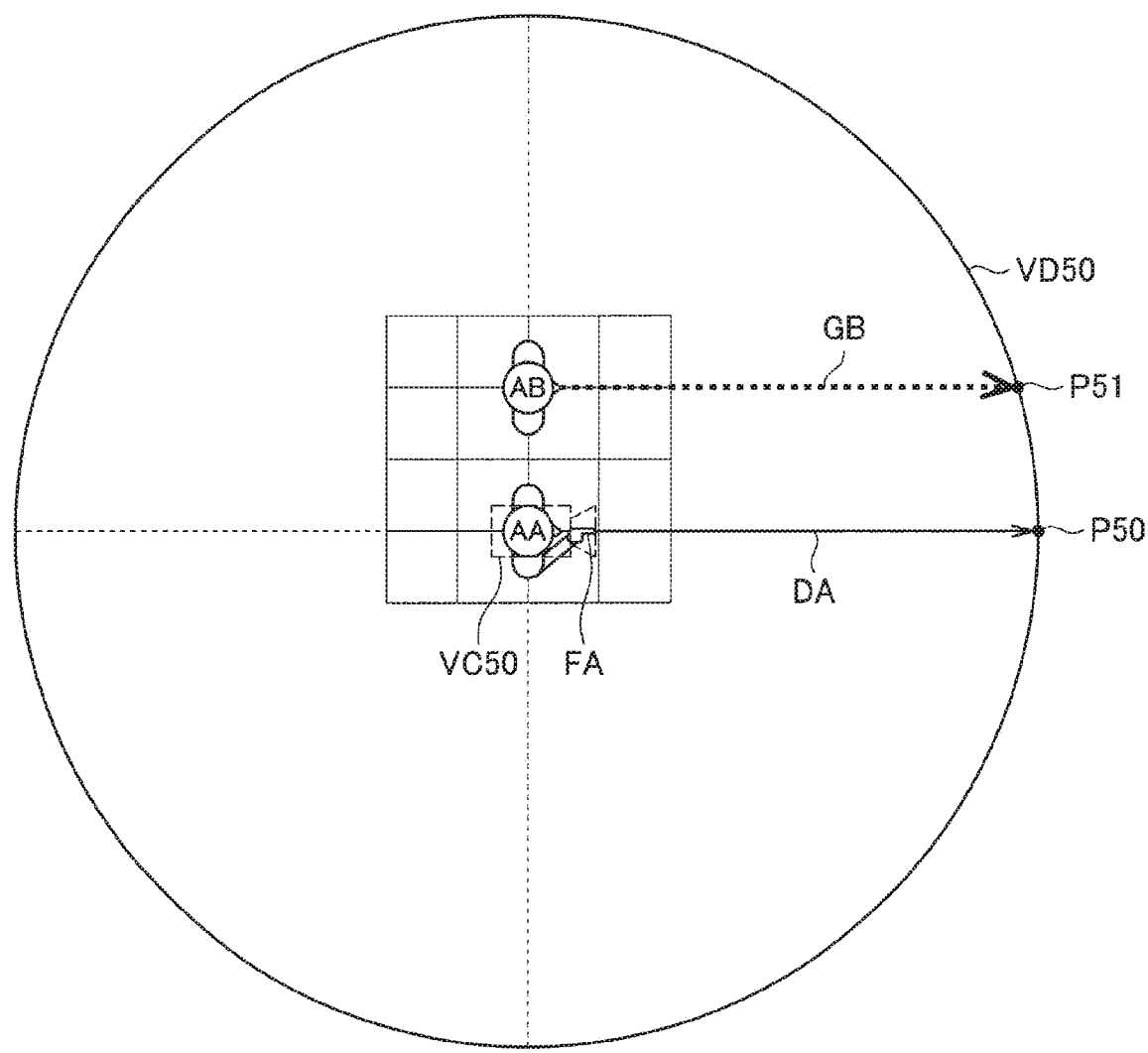
FIG. 14 is an explanatory drawing for describing Modification 1.

Additionally, the display controller 151 may similarly control the direction of the line-of-sight of the avatar (or orientation of the avatar's face). FIG. 14 shows a virtual space set by the HMD1A worn by the user UA on the basis of the posture of the user UB in FIG. 13 in a case where such control is not performed. That is, in FIG. 14, the wearing user is the user UA, and a virtual camera VC5 is arranged according to the position of the user UA. In the example of FIG. 14, a point P50 of a dome-like screen VD50 that the user UA wants to point at and a point P51 which is ahead of the line-of-sight GB of the avatar AB of the user UB are different.

Figure 15:
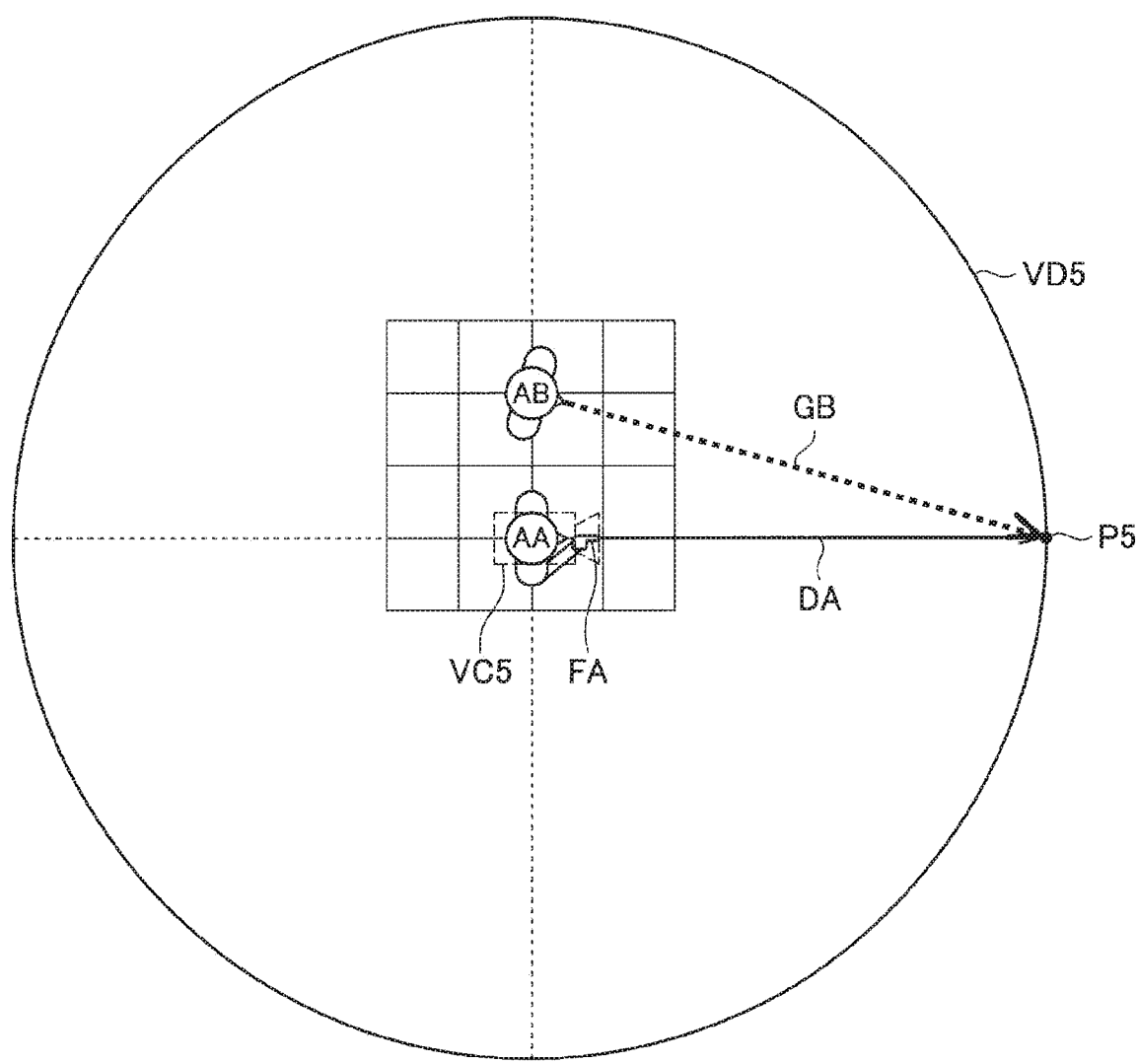
FIG. 15 is an explanatory drawing for describing Modification 1.

Hence, in a case where it is determined that another user (second user) directs his/her line-of-sight to a point of the omnidirectional image (an example of predetermined condition), the display controller 151 may control the posture of the other user also on the basis of the omnidirectional image. For example, as shown in FIG. 15, the display controller 151 of the present modification may control the posture of the avatar AB so that the line-of-sight GB of the avatar AB of the user UB heads toward a point P5 of a dome-like screen VD5 that the user UA wants to point at. Note that similar to FIG. 14, FIG. 15 shows a virtual space set by the HMD1A worn by the user UA.

As has been described, according to the present modification, it is possible to share the same position of the omnidirectional image among users, by the direction of the line-of-sight or the direction of pointing. In particular, in a case where the distance from the avatar to the virtual dome-like screen in the virtual space is short, a point ahead of the direction of the line-of-sight or the pointing direction tends to differ between users as in FIG. 14. Hence, the present modification becomes more effective.

<4-2. Modification 2>

Additionally, in the above embodiment, an example in which the viewpoint in the virtual space is a position corresponding to the position of the wearing user (e.g., head position of avatar of wearing user) has been described. However, the present technology is not limited to such an example. For example, the display controller 151 may arrange the viewpoint in a predetermined bird's-eye view position in the virtual space. Such an example will be described as Modified example 2 with reference to FIGS. 16 and 17.

Figure 16:
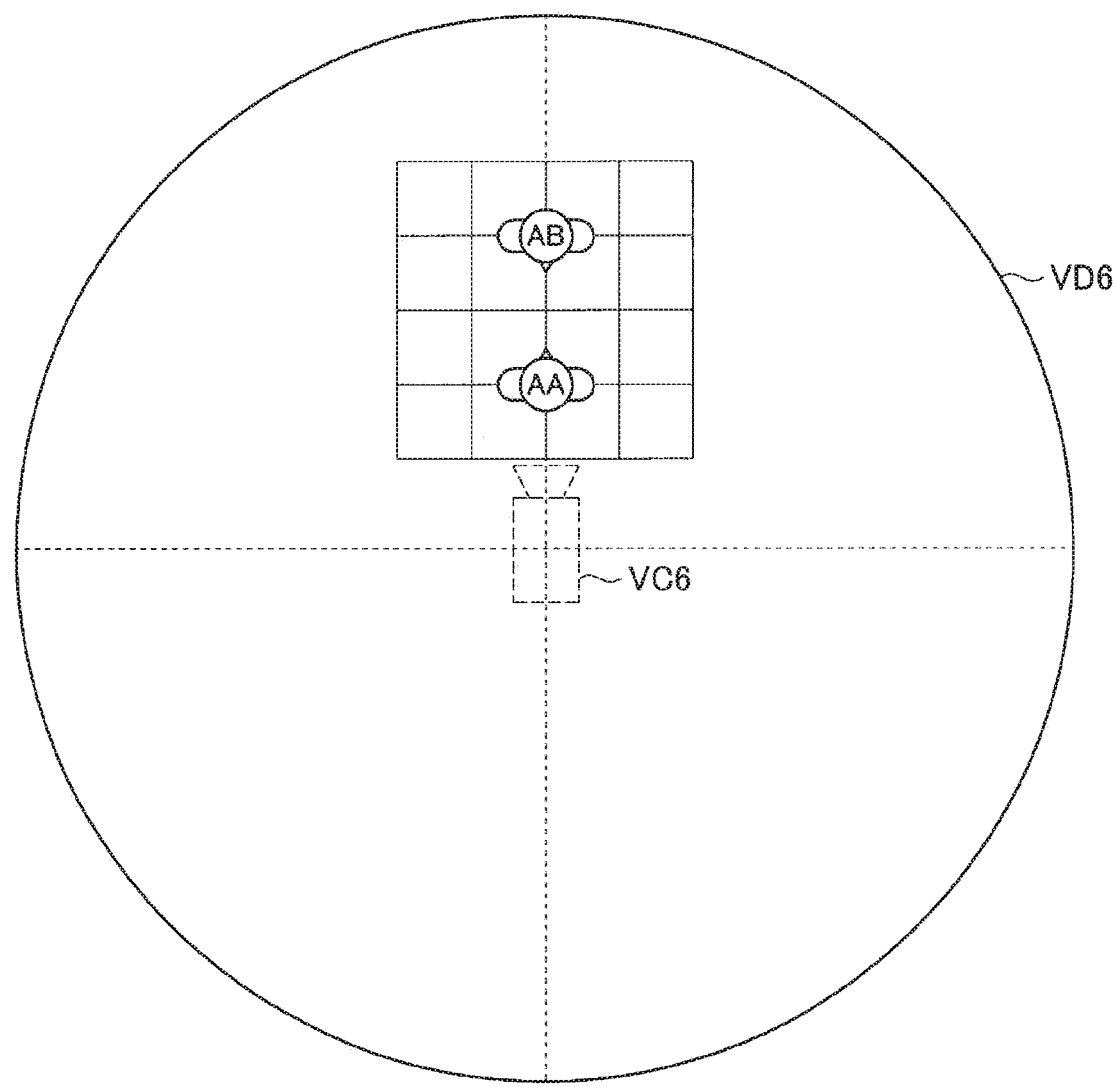
FIG. 16 is an explanatory drawing showing a virtual space set in Modification 2.

FIG. 16 is an explanatory drawing showing a virtual space set in the present modification. Note that, in FIG. 16, the wearing user may be a user UA or a user UB.

As shown in FIG. 16, a virtual camera VC6 is arranged in a bird's-eye view position from which the wearing user can also be looked down on, and a display controller 151 according to the present modification may generate a bird's-eye view image from the viewpoint of the virtual camera VC6 and display the image on a display unit 17. Note that, also in the present modification, a dome-like screen VD6 is arranged such that the position of the viewpoint is a preferred viewing position.

Note that the viewpoint may be moved from the position corresponding to the position of the wearing user to the bird's-eye view position according to a user operation or the like.

Figure 17:
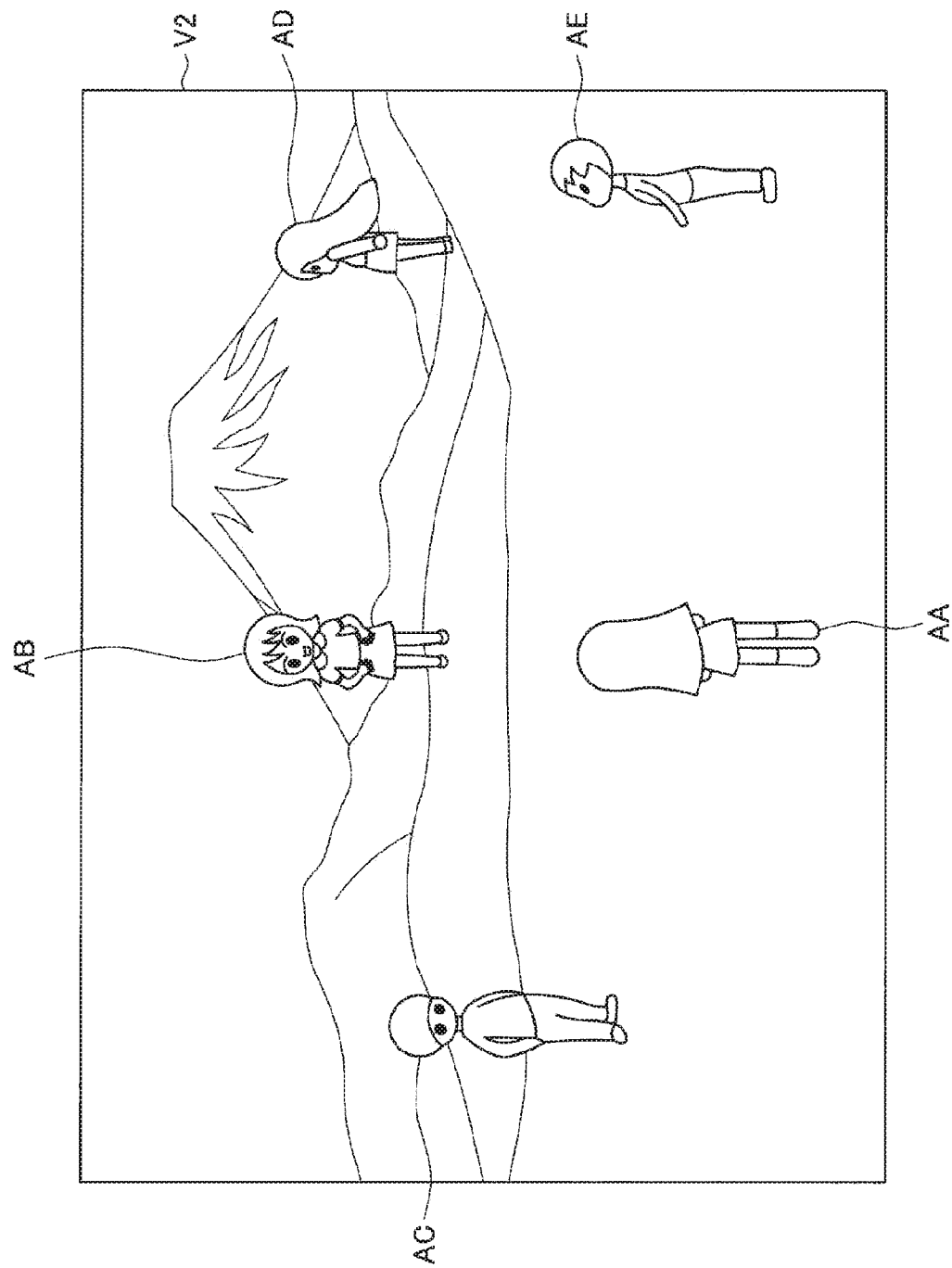
FIG. 17 is an explanatory drawing showing an example of a bird's-eye view image V2 displayed on a display unit 17 in Modification 3.

FIG. 17 is an explanatory drawing showing an example of a bird's-eye view image V2 displayed on a display unit 17 in the present modification. As shown in FIG. 17, the bird's-eye view image V2 can include avatars AA to AE of many users, including an avatar of the wearing user. Hence it is possible to look down on the positional relationship of multiple avatars.

<4-3. Modification 3>

In the above embodiment, an example in which an omnidirectional image is used as the background image has been described. However, the present technology is not limited to such an example. Various images may be used as the background image. For example, it is also possible to use a high resolution image having a high resolution such as a so-called 4K image or 8K image as a background image.

In such a case, a display controller may arrange an avatar in a virtual space, and arrange the high resolution image in the virtual space with reference to the position of the wearing user, so that the viewpoint is a preset preferred viewing position, and generate a field of view image from this viewpoint, for example.

Additionally, the background image may be an image rendered (generated) by a computer (computer graphics). In such a case, rendering of the background image may be performed on the basis of information regarding the positional movement of the user.

5. Hardware Configuration Example

Figure 18:
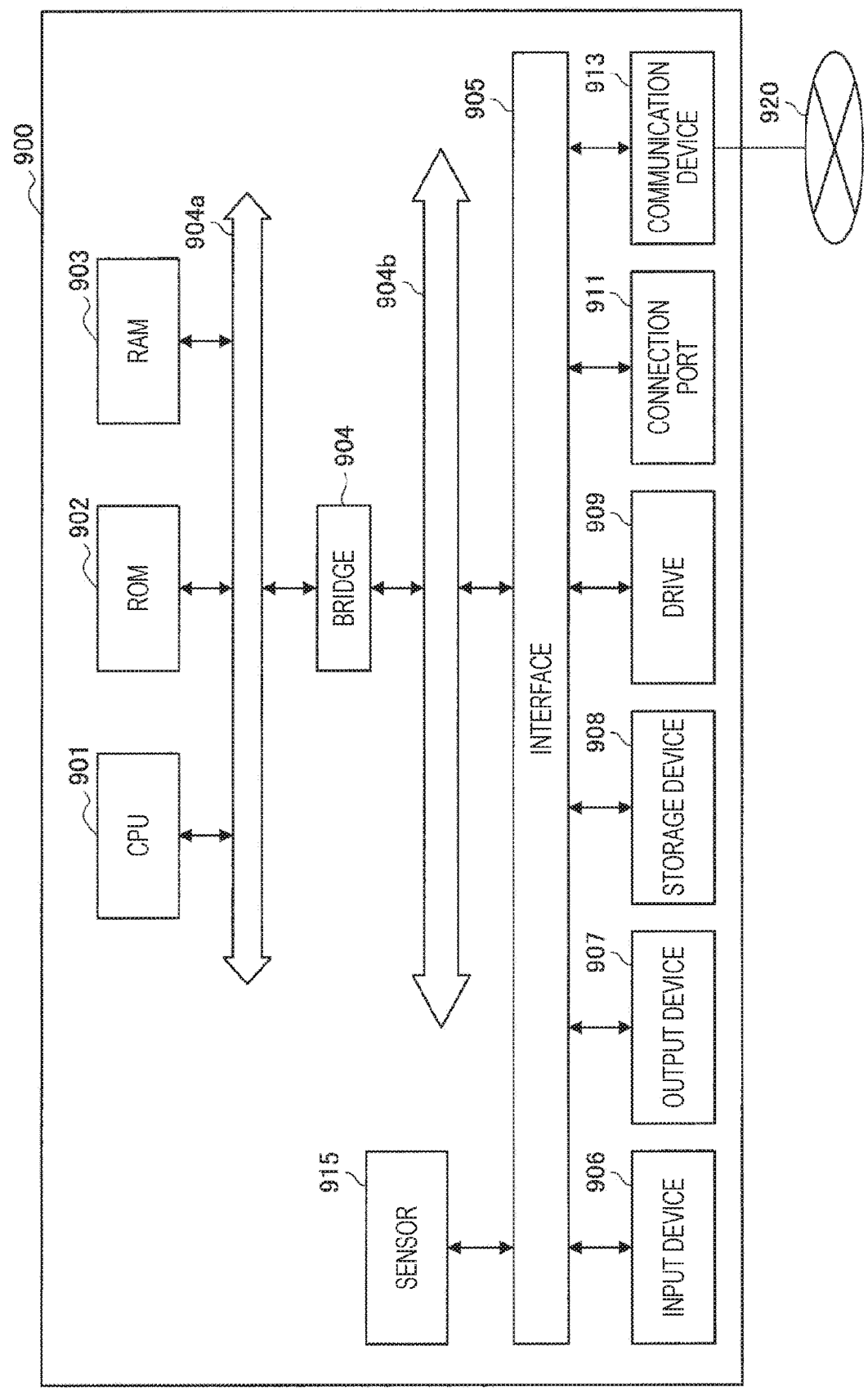
FIG. 18 is an explanatory drawing showing a hardware configuration example.

Hereinabove, the embodiments of the present disclosure have been described. Finally, a hardware configuration of the information processing device of the embodiment will be described with reference to FIG. 18. FIG. 18 is a block diagram showing an example of a hardware configuration of the information processing device of the embodiment. Note that an information processing device 900 shown in FIG. 18 can implement the above-described HMD1, the distribution server 2, the avatar management server 3, and the distributor terminal 4, for example. Information processing by the HMD1, distribution server 2, the avatar management server 3, and the distributor terminal 4 of the embodiment is achieved by cooperation of software and hardware described below.

As shown in FIG. 18, the information processing device 900 includes a central processing unit (CPU) 901, a read only memory (ROM) 902, a random access memory (RAM) 903, and a host bus 904a. Additionally, the information processing device 900 includes a bridge 904, an external bus 904b, an interface 905, an input device 906, an output device 907, a storage device 908, a drive 909, a connection port 911, a communication device 913, and a sensor 915. The information processing device 900 may have a processing circuit such as a DSP or an ASIC instead of or in addition to the CPU 901.

The CPU 901 functions as an arithmetic processing unit and a controller, and controls the overall operation in the information processing device 900 according to various programs. Additionally, the CPU 901 may be a microprocessor. The ROM 902 stores programs, calculation parameters, and the like, used by the CPU 901. The RAM 903 temporarily stores programs used in the execution of the CPU 901, and parameters and the like that appropriately change in the execution. The CPU 901 can form the controller 15, for example.

The CPU 901, the ROM 902, and the RAM 903 are mutually connected by a host bus 904a including a CPU bus and the like. The host bus 904a is connected to an external bus 904b such as a peripheral component interconnect/interface (PCI) bus through the bridge 904. Note that the host bus 904a, the bridge 904, and the external bus 904b do not necessarily need to be separately configured, and these functions may be implemented on one bus.

The input device 906 is implemented by a device such as a mouse, a keyboard, a touch panel, a button, a microphone, a switch, and a lever to which information is input by the user, for example. Additionally, the input device 906 may be a remote control device using infrared rays or other radio waves, or may be an external connection device such as a mobile phone or PDA corresponding to the operation of the information processing device 900, for example. Moreover, the input device 906 may include, for example, an input control circuit or the like that generates an input signal on the basis of the information input by the user using the above input unit, and outputs the generated input signal to the CPU 901. The user of the information processing device 900 can input various data into the information processing device 900 and instruct processing operations by operating the input device 906.

The output device 907 includes a device capable of visually or aurally notifying the user of the acquired information. Such devices include display devices such as a CRT display device, a liquid crystal display device, a plasma display device, an EL display device and a lamp, sound output devices such as a speaker and a headphone, a printer device, and the like. The output device 907 outputs results obtained from various processing performed by the information processing device 900, for example. Specifically, the display device visually displays the results obtained from the various processing performed by the information processing device 900 in various formats such as text, images, tables, graphs, and the like. On the other hand, the sound output device converts an audio signal including reproduced speech data, sound data, and the like into an analog signal and aurally outputs the analog signal. The output device 907 can form the display unit 17 and the sound output unit 19, for example.

The storage device 908 is a device for data storage formed as an example of a storage unit of the information processing device 900. The storage device 908 is implemented by a magnetic storage unit device such as an HDD, a semiconductor storage device, an optical storage device, a magneto-optical storage device, or the like, for example. The storage device 908 may include a storage medium, a recording device that records data in the storage medium, a reading device that reads data from the storage medium, a deletion device that deletes data recorded in the storage medium, and the like. The storage device 908 stores programs executed by the CPU 901, various data, various data acquired from the outside, and the like. The storage device 908 can form the image storage unit 22 and the user information storage unit 32, for example.

The drive 909 is a reader/writer for a storage medium, and is built in or externally attached to the information processing device 900. The drive 909 reads out information recorded in a removable storage medium such as a mounted magnetic disk, optical disk, magneto-optical disk, or semiconductor memory, and outputs the information to the RAM 903. Additionally, the drive 909 can also write information into the removable storage medium.

The connection port 911 is an interface connected to an external device, and is a connection port to an external device capable of data transmission by a universal serial bus (USB) or the like, for example.

The communication device 913 is a communication interface including a communication device or the like for connecting to the network 920, for example. The communication device 913 is a communication card for wired or wireless local area network (LAN), long term evolution (LTE), Bluetooth (registered trademark), wireless USB (WUSB), or the like, for example. Additionally, the communication device 913 may be a router for optical communication, a router for asymmetric digital subscriber line (ADSL), a modem for various communications, or the like. The communication device 913 can transmit and receive signals and the like according to a predetermined protocol such as TCP/IP, for example, with the Internet or another communication device, for example. The communication device 913 can form the communication unit 13, for example.

The sensor 915 is various sensors such as an acceleration sensor, a gyro sensor, a geomagnetic sensor, an optical sensor, a sound sensor, a distance measuring sensor, and a force sensor, for example. The sensor 915 acquires information regarding the state of the information processing device 900 such as the posture and movement speed of the information processing device 900, and information regarding the surrounding environment of the information processing device 900 such as brightness and noise around the information processing device 900. Additionally, the sensor 915 may include a GPS sensor that receives GPS signals and measures latitude, longitude and altitude of the device. The sensor 915 can form the sensor unit 11, for example.

Note that the network 920 is a wired or wireless transmission path of information transmitted from a device connected to the network 920. For example, the network 920 may include the Internet, a public network such as a telephone network and a satellite communication network, various local area networks (LANs) including Ethernet (registered trademark), a wide area network (WAN), or the like. Additionally, the network 920 may include a leased line network such as an internet protocol-virtual private network (IP-VPN).

Hereinabove, an example of a hardware configuration capable of implementing the functions of the information processing device 900 of the embodiment has been shown. Each of the components described above may be implemented using a general-purpose member, or may be implemented by hardware specialized for the function of each component. Accordingly, it is possible to change the hardware configuration to be used, as appropriate, according to the technical level at each occasion of carrying out the embodiment.

Note that a computer program for implementing each function of the information processing device 900 of the embodiment as described above can be prepared and implemented on a PC or the like. Additionally, a computer readable recording medium in which such a computer program is stored can be provided. The recording medium is, for example, a magnetic disk, an optical disk, a magneto-optical disk, a flash memory or the like. Additionally, the above computer program may be distributed through a network without using a recording medium, for example.

6. Conclusion

As described above, according to the embodiment of the present disclosure, it is possible to view an image while virtually sharing the image with another user.

Hereinabove, the preferred embodiments of the present disclosure have been described in detail with reference to the accompanying drawings. However, the technical scope of the present disclosure is not limited to such examples. It will be apparent to those skilled in the art of the present disclosure that various changes or modifications can be conceived within the scope of the technical idea described in the claims. It is understood that these also belong to the technical scope of the present disclosure, as a matter of course.

For example, while an example in which the information processing device (HMD1) including the display unit performs display control processing has been described in the above embodiment, the present technology is not limited to such an example. For example, the function of generating an image to be displayed on the display unit of another device may be understood as a function as a display controller.

For example, an information processing device (e.g., the distribution server 2, the avatar management server 3, or the like shown in FIG. 4) connected to a display device provided with a display unit through a communication network may have the above-described function as a display controller. In such a case, an image including a background image and an avatar may be generated and transmitted to the display device by the display controller of the information processing device, and the display device may display the received image.

Note that the information processing device connected to the display device provided with the display unit through the communication network, and the display device may have the above-described functions as the display controller in a distributed manner. For example, the information processing device may arrange avatars and an omnidirectional image in a virtual space to control the display of the display device. In such a case, the display device may receive information on the virtual space and generate a field of view image from a viewpoint according to the sensed orientation of the user.

Additionally, the display unit does not necessarily have to be an HMD. For example, the display unit may be a display held by a user, an installed display, or a screen (including dome-like screen) on which an image is projected by a projector. In such a case, the display or the projector may have the above-described function as the display controller, or an information processing device connected to the display or the projector or another information processing device connected to the information processing device through a communication network may have the function as the display control unit described above.

Additionally, the effects described in the present specification are merely illustrative or exemplary, and are not limiting. That is, the technology according to the present disclosure can exhibit other effects apparent to those skilled in the art from the description of the present specification, in addition to or instead of the effects described above.

Note that the following configurations are also within the technical scope of the present disclosure.

(1)

An information processing device including a display controller that controls display for a first user on the basis of a background image arranged in a virtual space with reference to a position of the first user in the virtual space, and an object related to a second user arranged in the virtual space so as to maintain a relative positional relationship between the first user and the second user in the virtual space.

(2)

The information processing device according to (1), in which the display controller generates a field of view image from a viewpoint arranged in a position corresponding to the position of the first user in the virtual space, and causes the field of view image to be displayed.

(3)

The information processing device according to (2), in which the background image is arranged such that a position of the viewpoint is a predetermined preferred viewing position.

(4)

The information processing device according to any one of (2) and (3), in which the display controller controls a direction of the viewpoint according to an orientation of the first user.

(5)

The information processing device according to any one of (1) to (4), in which the display controller causes a message sent by the second user to be displayed.

(6)

The information processing device according to any one of (1) to (5), further including a sound output controller that causes a message sent by the second user to be acoustically output.

(7)

The information processing device according to (6), in which the sound output controller controls sound output such that the message is audible from a position of the object related to the second user.

(8)

The information processing device according to any one of (5) to (7), in which the display controller controls the display such that the object related to the second user is emphasized in a case where the second user sends the message to the first user.

(9)

The information processing device according to any one of (1) to (8), in which the display controller controls the display also on the basis of an object related to the first user.

(10)

The information processing device according to any one of (1) to (9), in which the display controller controls, on the basis of user information, an object related to a user corresponding to the user information.

(11)

The information processing device according to (10), in which the user information includes posture information regarding a posture of each of the users, and the display controller controls, on the basis of the posture information, a posture of the object related to the user corresponding to the posture information.

(12)

The information processing device according to (11), in which in a case where the posture information regarding a posture of the second user satisfies a predetermined condition, the display controller controls the posture of the object related to the second user also on the basis of the background image arranged in the virtual space.

(13)

The information processing device according to any one of (10) to (12), in which the display controller causes an object based on past user information to be displayed.

(14)

The information processing device according to (13), in which the display controller controls the display such that an object based on real-time user information is distinguished from an object based on the past user information.

(15)

The information processing device according to any one of (13) and (14), in which the relative positional relationship between the first user and the second user is identified on the basis of the past user information.

(16)

The information processing device according to any one of (1) to (15), in which the relative positional relationship between the first user and the second user changes according to a positional movement of the first user or the second user.

(17)

The information processing device according to any one of (1) to (16), in which the display controller generates a bird's-eye view image from a viewpoint arranged in a predetermined bird's-eye view position in the virtual space, and displays the bird's-eye view image.

(18)

The information processing device according to any one of (1) to (17), in which the display controller controls display of a device worn by the first user.

(19)

An information processing method including controlling, by a processor, display for a first user on the basis of a background image arranged in a virtual space with reference to a position of the first user in the virtual space, and an object related to a second user arranged in the virtual space so as to maintain a relative positional relationship between the first user and the second user in the virtual space.

(20)

A program for causing a computer to implement a function of controlling display for a first user on the basis of a background image arranged in a virtual space with reference to a position of the first user in the virtual space, and an object related to a second user arranged in the virtual space so as to maintain a relative positional relationship between the first user and the second user in the virtual space.

REFERENCE SIGNS LIST

1 HMD
2 Distribution server
3 Avatar management server
4 Distributor terminal
5 Communication network
9 Information processing system
11 Sensor unit 13 Communication unit
15 Controller
17 Display unit
19 Sound output unit
22 Image storage unit
32 User information storage unit
151 Display controller
153 Sound output controller

The invention claimed is:

1. An information processing device, comprising:
a display controller configured to:
arrange a background image in a virtual space with reference to a position of a first user in the virtual space;
arrange an object related to a second user in the virtual space so as to maintain a relative positional relationship between the first user and the second user in the virtual space;
control, based on a pointing operation of the first user towards a specific position in the background image, a posture of the object related to the second user such that the object related to the second user faces towards the specific position in the background image; and
control a display operation of a display screen based on the background image and the posture of the object related to the second user.

2. The information processing device according to claim 1, wherein the display controller is further configured to:
generate a field of view image from a viewpoint,
wherein the viewpoint is in a position corresponding to the position of the first user in the virtual space; and
control the display screen to display the field of view image.

3. The information processing device according to claim 2, wherein the background image is arranged such that the position of the viewpoint is a specific viewing position.

4. The information processing device according to claim 2, wherein the display controller is further configured to control a direction of the viewpoint based on an orientation of the first user.

5. The information processing device according to claim 1, wherein the display controller is further configured to control the display screen to display a message sent by the second user.

6. The information processing device according to claim 1, further comprising a sound output controller configured to control sound output of a message sent by the second user.

7. The information processing device according to claim 6, wherein the sound output controller is further configured to control the sound output such that the message is audible from a position of the object related to the second user.

8. The information processing device according to claim 5, wherein the display controller is further configured to control, in a case where the second user sends the message to the first user, the display screen to emphasize the object related to the second user.

9. The information processing device according to claim 1, wherein the display controller is further configured to control the display operation based on an object related to the first user.

10. The information processing device according to claim 1, wherein the display controller is further configured to control, based on user information, an object related to the first user corresponding to the user information.

11. The information processing device according to claim 10, wherein
the user information includes posture information regarding a posture of each of the first user and the second user, and
the display controller is further configured to control, based on the posture information, a posture of the object related to the first user.

12. The information processing device according to claim 11, wherein, in a case where the posture information regarding the posture of the second user satisfies a specific condition, the display controller is further configured to control the posture of the object related to the second user based on the background image arranged in the virtual space.

13. The information processing device according to claim 10, wherein the display controller is further configured to control, based on past user information, the display screen to display the object related to the second user.

14. The information processing device according to claim 13, wherein the display controller is further configured to control, based on real-time user information, the display screen to display the object related to the first user such that the object related to the first user is distinguished from the object related to the second user.

15. The information processing device according to claim 13, wherein the relative positional relationship between the first user and the second user is identified based on the past user information.

16. The information processing device according to claim 1, wherein the relative positional relationship between the first user and the second user changes based on a positional movement of at least one of the first user or the second user.

17. The information processing device according to claim 1, wherein the display controller is further configured to:
generate a bird's-eye view image from a viewpoint,
wherein the viewpoint is in a specific bird's-eye view position in the virtual space; and
control the display screen to display the bird's-eye view image.

18. The information processing device according to claim 1, wherein the display screen is in a device wearable by the first user.

19. An information processing method, comprising:
arranging, by a processor, a background image in a virtual space with reference to a position of a first user in the virtual space;
arranging, by the processor, an object related to a second user in the virtual space so as to maintain a relative positional relationship between the first user and the second user in the virtual space;
controlling, by the processor, based on a pointing operation of the first user towards a specific position in the background image, a posture of the object related to the second user such that the object related to the second user faces towards the specific position in the background image; and
controlling, by the processor, a display operation of a display screen based on the background image and the posture of the object related to the second user.

20. A non-transitory computer-readable medium having stored thereon computer-executable instructions which, when executed by a processor, cause the processor to execute operations, the operations comprising:
arranging a background image in a virtual space with reference to a position of a first user in the virtual space;
arranging an object related to a second user in the virtual space so as to maintain a relative positional relationship between the first user and the second user in the virtual space;

controlling, based on a pointing operation of the first user towards a specific position in the background image, a posture of the object related to the second user such that the object related to the second user faces towards the specific position in the background image; and
controlling a display operation of a display screen based on the background image and the posture of the object related to the second user.

* * * * *